(12) United States Patent
Parkyn et al.

(10) Patent No.: US 7,731,395 B2
(45) Date of Patent: Jun. 8, 2010

(54) LINEAR LENSES FOR LEDS

(75) Inventors: William A. Parkyn, Lomita, CA (US); David G. Pelka, Los Angeles, CA (US)

(73) Assignee: Anthony International, Sylmar, CA (US)

( * ) Notice: Subject to any disclaimer, the term of this patent is extended or adjusted under 35 U.S.C. 154(b) by 655 days.

(21) Appl. No.: 11/493,368

(22) Filed: Jul. 26, 2006

(65) Prior Publication Data

US 2007/0058369 A1    Mar. 15, 2007

Related U.S. Application Data

(63) Continuation-in-part of application No. 11/332,738, filed on Jan. 17, 2006, now Pat. No. 7,273,299.

(60) Provisional application No. 60/646,617, filed on Jan. 26, 2005.

(51) Int. Cl.
*F21V 5/00* (2006.01)
*F21V 33/00* (2006.01)

(52) U.S. Cl. .......................... 362/335; 362/92; 362/244

(58) Field of Classification Search ............. 362/92–94, 362/800, 555, 125, 290, 311.01–311.1, 311.14, 362/311.15, 326, 331, 332, 334, 335, 244, 362/235, 249.02; 62/264
See application file for complete search history.

(56) References Cited

U.S. PATENT DOCUMENTS

| | | | |
|---|---|---|---|
| 2,136,429 A | 11/1938 | Forsyth | |
| 2,173,329 A | 9/1939 | Geiser | |
| 2,254,962 A | 9/1941 | Harris et al. | |
| 4,225,808 A | 9/1980 | Saraceni | |
| 4,698,730 A | 10/1987 | Sakai et al. | |
| 4,733,332 A | 3/1988 | Yamashita et al. | |
| 4,734,836 A * | 3/1988 | Negishi | 362/311.06 |
| 4,748,548 A | 5/1988 | Barton | |
| 4,893,223 A | 1/1990 | Arnold | |
| 4,941,072 A | 7/1990 | Yasumoto et al. | |
| 4,965,488 A | 10/1990 | Hihi | |
| 5,050,047 A | 9/1991 | Viner et al. | |
| 5,057,978 A | 10/1991 | Conti | |

(Continued)

FOREIGN PATENT DOCUMENTS

DE    43 11 706 A1    10/1994

(Continued)

OTHER PUBLICATIONS

U.S. Appl. No. 11/332,738, filed Jan. 17, 2006.

(Continued)

*Primary Examiner*—Bao Q Truong
(74) *Attorney, Agent, or Firm*—Knobbe, Martens, Olson & Bear, LLP

(57) ABSTRACT

Various embodiments described herein comprise array of light emitting diodes and a cylindrical lens having front and rear curved surfaces. The cylindrical lens is disposed to receive light from the light emitting diodes and to redistribute the light. The cylindrical lens is located no more than about 8 inches distance from the front an illumination target, which may for example, comprise products on shelves in a refrigerator. The front and rear surfaces of the cylindrical lens are shaped to provide substantially uniform illumination across the target.

33 Claims, 23 Drawing Sheets

U.S. PATENT DOCUMENTS

| | | | |
|---|---|---|---|
| 5,437,504 A | 8/1995 | Halvatzis | |
| 5,442,412 A | 8/1995 | Frey et al. | |
| 5,450,297 A | 9/1995 | Akashi et al. | |
| 5,471,372 A * | 11/1995 | Mamelson et al. | 362/92 |
| 5,485,317 A | 1/1996 | Perissinotto et al. | |
| 5,607,225 A | 3/1997 | Halvatzis | |
| 5,645,330 A * | 7/1997 | Artwohl et al. | 312/116 |
| 5,787,618 A | 8/1998 | Mullis | |
| 5,907,648 A | 5/1999 | Miller et al. | |
| 5,999,686 A | 12/1999 | Leaman | |
| 6,033,087 A | 3/2000 | Shozo et al. | |
| 6,082,884 A | 7/2000 | McDonald et al. | |
| 6,181,417 B1 | 1/2001 | Dosmann | |
| 6,200,011 B1 | 3/2001 | Miller et al. | |
| 6,273,581 B1 | 8/2001 | Neiser | |
| 6,325,523 B1 * | 12/2001 | Santosuosso et al. | 362/125 |
| 6,354,098 B1 | 3/2002 | Bardin et al. | |
| 6,361,186 B1 | 3/2002 | Slayden | |
| 6,550,269 B2 | 4/2003 | Rudick | |
| 6,592,238 B2 | 7/2003 | Cleaver et al. | |
| 6,834,979 B1 | 12/2004 | Cleaver et al. | |
| 6,900,587 B2 | 5/2005 | Suehiro et al. | |
| 6,945,672 B2 | 9/2005 | Du et al. | |
| 7,011,421 B2 | 3/2006 | Hulse et al. | |
| 7,029,147 B2 | 4/2006 | Nawashiro | |
| 7,111,964 B2 | 9/2006 | Suehiro et al. | |
| 7,121,675 B2 * | 10/2006 | Ter-Hovhannisian | 362/92 |
| 7,153,000 B2 | 12/2006 | Park et al. | |
| 7,163,326 B2 | 1/2007 | Cassarly et al. | |
| 7,273,299 B2 | 9/2007 | Parkyn et al. | |
| 7,330,632 B1 | 2/2008 | Buelow, II et al. | |
| 7,374,313 B2 | 5/2008 | Cassarly et al. | |
| 7,422,347 B2 * | 9/2008 | Miyairi et al. | 362/335 |
| 7,465,074 B2 * | 12/2008 | Blumel | 362/335 |
| 7,549,783 B2 | 6/2009 | Cassarly et al. | |
| 7,588,342 B2 | 9/2009 | Buelow, II et al. | |
| 2001/0050849 A1 | 12/2001 | Leifer et al. | |
| 2004/0061433 A1 | 4/2004 | Izuno et al. | |
| 2004/0114371 A1 | 6/2004 | Lea et al. | |
| 2005/0007777 A1 | 1/2005 | Klipstein et al. | |
| 2005/0052878 A1 | 3/2005 | Yamada et al. | |
| 2005/0122711 A1 | 6/2005 | Matthews et al. | |
| 2005/0157495 A1 | 7/2005 | Bruck | |
| 2007/0247835 A1 | 10/2007 | Buelow, II et al. | |

FOREIGN PATENT DOCUMENTS

| | | |
|---|---|---|
| DE | 297 17 444 U1 | 2/1998 |
| EP | 0 971 186 A2 | 1/2000 |
| FR | 2 716 789 | 9/1995 |
| JP | 2003-057622 | 2/2003 |
| JP | 2005-008844 | 1/2005 |

OTHER PUBLICATIONS

Parkyn, et al. "Linear lighting systems for shelf and cove lighting", presented at the Fifth International Conference on Solid State Lighting, held Aug. 1-4, 2005, and published in the Proceedings of SPIE vol. 5941, Sep. 2, 2005.

* cited by examiner

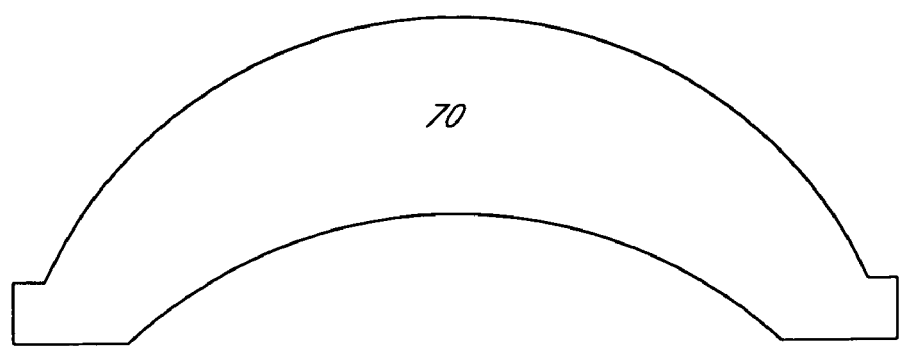
FIG. 7A
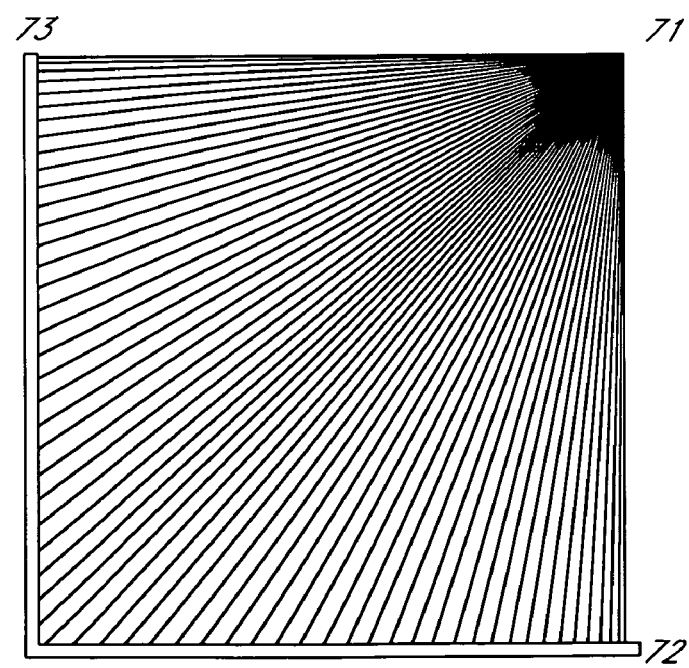
FIG. 7B

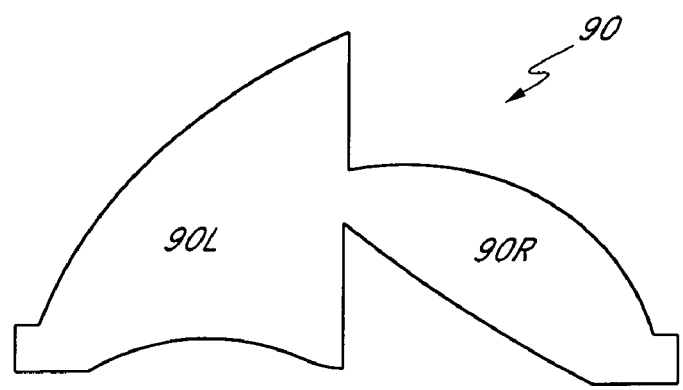
FIG.9A
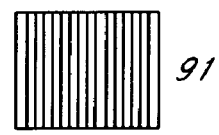
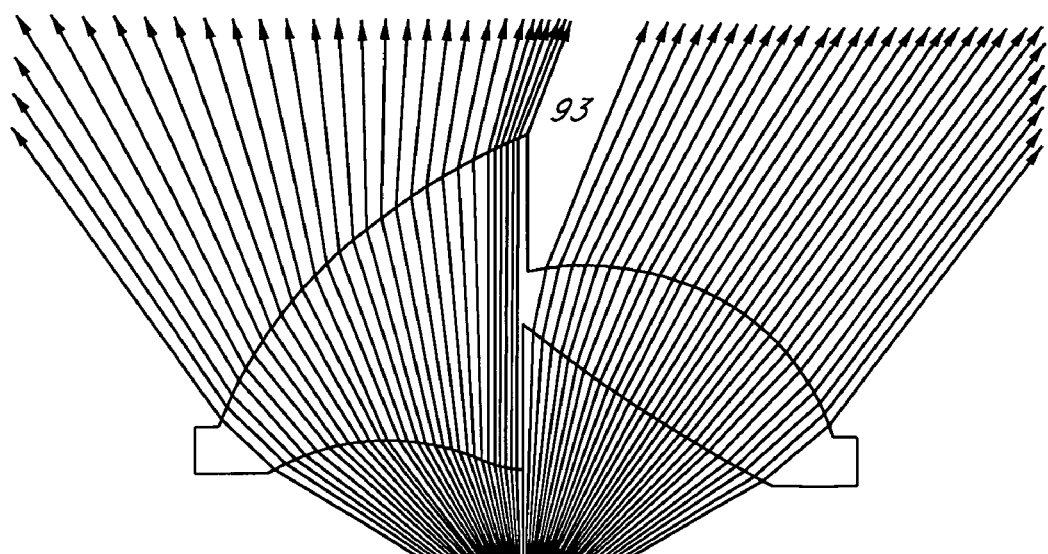
FIG.9B

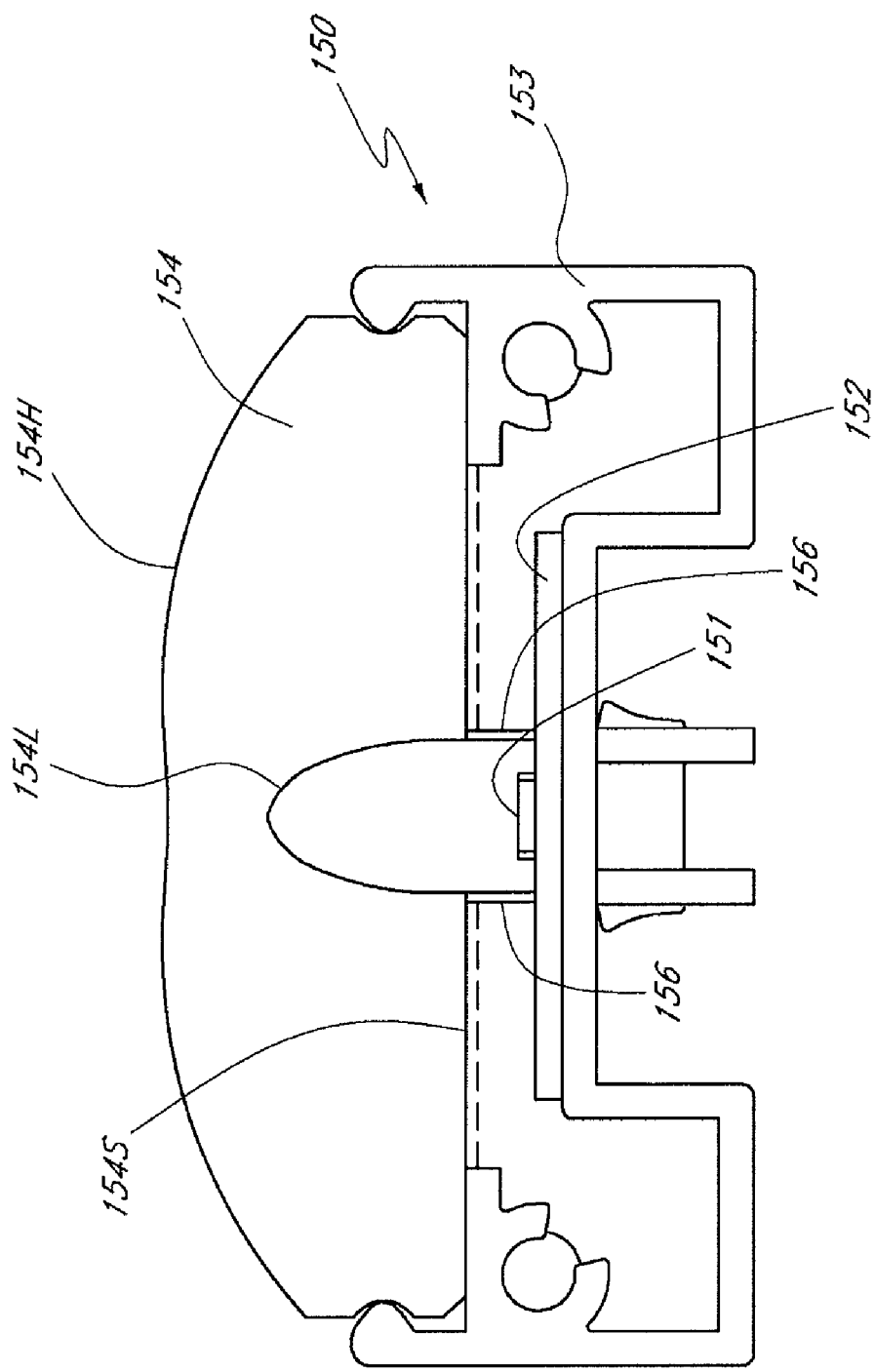

LINEAR LENSES FOR LEDS

CROSS-REFERENCE TO RELATED APPLICATIONS

This application is a continuation-in-part of U.S. application Ser. No. 11/332,738, filed on Jan. 17, 2006 now U.S. Pat. No. 7,273,299 which claims the benefit of U.S. Provisional Patent Application Ser. No. 60/646,617, filed Jan. 26, 2005, the entire contents of which are incorporated by reference herein.

BACKGROUND

1. Field of the Invention

The present invention relates generally to a lighting system for providing a uniform light distribution, and particularly to a cylindrical lens for uniformly lighting long shelves in a refrigerator compartment 2. Description of the Related Art A prominent means of lighting long store-shelves is the fluorescent lamp, due to its low cost and good luminous efficacy. While the linear geometry of this lamp is appropriate for long shelves, its isotropic radiation pattern is not, because most of the light misses the target, unless bulky and expensive reflectors are employed. Also, the light that does make it to the shelf is not at all uniform.

In addition, lighting cold storage compartments, such as commercial refrigerators, provides unique issues. The lighting equipment produces heat yet the hot lights are operating within a cold environment. This cold hinders the performance of the fluorescent lights. In particular, in such cold compartments, fluorescent lamps are disadvantageous due to their energy efficiency and their reduced lifetime of only a few thousand hours. Additionally, the lighting should be adequate to illuminate the products within the compartment and should be visually appealing to catch the eye of the consumer.

Light emitting diodes, however, have greater efficacy and even longer operational life (e.g., 50-100 thousand hours) at low temperature in comparison to fluorescent tubes which also produce the highly nonuniform illumination. The major advantages longer life, lower power consumption, as well as compact package size make LEDs a desirable light source for illuminating supermarket freezers.

Low-cost LEDs can be economically provided on low-voltage tapes, spaced every 10-20 mm, such as those sold by the Osram GmbH, Munich, Germany, under the 'Linear Flex' product line. Furthermore, because LEDs radiate into a hemisphere (or less), optical lensing can be employed to distribute their light output. Typically, such optics have been mounted individually on the LEDs as domes. Such conventional dome lens, however, do not produce the desired illumination, e.g., substantially uniform, in this setting where, for example, the objects, are close to the LEDs but are also wide.

What is needed is optics for providing uniform illumination for products on a shelf in a commercial refrigerator where the shelf is inches from the LEDs yet is wide, e.g., at least 2 feet. The present invention will remedy the current lack of suitable optics for uniform-illuminance LED shelf-lights, and in particular will provide numerous preferred embodiments for different illumination geometries for use in commercial refrigeration.

SUMMARY

In one embodiment a lighting system includes an array of light emitting diodes, and a cylindrical lens having a central portion and a pair of surrounding outer portions, said cylindrical lens disposed to receive light from said light emitting diodes to redistribute said light. The central portion is shaped to uniformly illuminate a first planar region disposed a first distance from said array and (ii) said outer portions of said cylindrical lens are shaped to uniformly illuminate outer portions of a second planar region at a second distance from the array.

In an alternative embodiment, a refrigerator comprising a refrigerator door frame, at least one refrigerator door, a refrigerator compartment, a plurality of shelves positioned in said refrigerator compartment such that front edges of said plurality of shelves form a product display plane transverse to said plurality of shelves, an array of light emitting diodes, and a cylindrical lens having front and rear curved surfaces, said cylindrical lens disposed to receive light from said light emitting diodes and to redistribute said light, said cylindrical lens being located no more than about 8 inches distance from the front edges of said plurality of shelves is provided. The front and rear surfaces of said cylindrical lens are shaped to provide substantially uniform illumination across a portion of said product display plane having a width substantially equal to the width of said front edge of one of said shelves.

In an alternative embodiment refrigerator comprising a refrigerator door frame, at least one refrigerator door, a refrigerator compartment, a plurality of shelves positioned in said refrigerator compartment such that front edges of said plurality of shelves form a product display plane transverse to said plurality of shelves, an array of light emitting diodes, and a cylindrical lens having front and rear curved surfaces, said cylindrical lens disposed to receive light from said light emitting diodes and to redistribute said light, said cylindrical lens located no more than 2 inches distance from the front edges of said plurality of shelves is provided. The front and rear surfaces are shaped to provide substantially uniform illumination across a pair of spaced apart regions in said product display plane.

In an alternative embodiment, a lighting system includes an array of light emitting diodes, and a cylindrical lens having a central portion and a pair of surrounding outer portions. The central portion is shaped to refract light from the light emitting diodes into an inner distribution of angles and said pair of surrounding outer portions is shaped to refract light from the light emitting diodes into an outer distribution of angles disposed about said inner distribution angles, such that (i) light in said inner distribution of angles illuminates a central region of a first plane more uniformly than said light in said outer distribution illuminates outer regions of said first plane and (ii) light in said outer distribution illuminates outer regions of a second plane more uniformly than said light in said inner distribution illuminates a inner region of said second plane.

In an alternative embodiment, a lighting system includes an array of light emitting diodes and a cylindrical lens having a central portion and a pair of surrounding outer portions, wherein (i) said central portion is shaped to match the cumulative lateral flux of the array of light emitting diodes with the cumulative lateral flux of a uniformly illuminated central region of a first plane and (ii) said outer portions of said cylindrical lens are shaped to match the cumulative lateral flux of the array of light emitting diodes with the cumulative lateral flux of a uniformly illuminated outer region of a second plane.

In an alternative embodiment, a lighting system includes an array of light emitting diodes, and a cylindrical lens disposed to receive light from said light emitting diodes to redistribute said light, said cylindrical lens having first and second curved surfaces, said first surface having negative optical power, said second surface having a central portion and a pair of surrounding outer portions, said central portion having negative optical power to increase uniformity in illuminating a first planar region and said outer portions having positive optical power so as to increase uniformity in illuminating a second planar region.

In an alternative embodiment, a refrigerator comprising a refrigerator door frame, at least one refrigerator door, a refrigerator compartment, a plurality of shelves positioned in said refrigerator compartment such that front edges of said plurality of shelves form a product display plane transverse to said plurality of shelves, an array of light emitting diodes, and a cylindrical lens having front and rear curved surfaces is provided. The cylindrical lens is lens disposed to receive light from said light emitting diodes and to redistribute said light, wherein said front and rear surfaces of said cylindrical lens are shaped to match the cumulative lateral flux of the array of light emitting diodes with the cumulative lateral flux of a uniformly illuminated portion of said product display plane.

In an alternative embodiment, a refrigerator comprising a refrigerator door frame, at least one refrigerator door, a refrigerator compartment, a plurality of shelves positioned in said refrigerator compartment such that front edges of said plurality of shelves form a product display plane transverse to said plurality of shelves, an array of light emitting diodes, and a cylindrical lens having front and rear curved surfaces is provided. The cylindrical lens is disposed to receive light from said light emitting diodes and to redistribute said light. The front and rear surfaces of said cylindrical lens are shaped to provide substantially uniform illumination across a portion of said product display plane between about 6 inches and 12 inches wide, said substantially uniform illumination varying by no more than about 30% per inch.

In an alternative embodiment, a refrigerator comprising a refrigerator door frame, at least one refrigerator door, a refrigerator compartment, a plurality of shelves positioned in said refrigerator compartment such that front edges of said plurality of shelves form a product display plane transverse to said plurality of shelves, an array of light emitting diodes and a cylindrical disposed to receive light from said light emitting diodes to redistribute said light is provided. The cylindrical lens has a central portion and an outer portion, said central portion having either more negative power or less positive power than said outer portion such that said central portion is more diverging than said outer portion so as to increase uniformity in illuminating a planar region.

In an alternative embodiment, a lighting system includes an array of light emitting diodes, a cylindrical lens having front and rear surfaces, said cylindrical lens disposed to receive light from said light emitting diodes and to redistribute said light, and a diffuser positioned between said array of light emitting diodes and said cylindrical lens. The front and rear surfaces of said cylindrical lens are shaped to match the cumulative lateral flux of the array of light emitting diodes with the cumulative lateral flux of a uniformly illuminated portion of a planar region.

In an alternative embodiment, a lighting system includes an array of light emitting diodes, a cylindrical lens having front and rear surfaces, said cylindrical lens disposed to receive light from said light emitting diodes and to redistribute said light, and a mask positioned between said array of light emitting diodes and said cylindrical lens, said mask configured to block transmission of light incident thereon. The front and rear surfaces of said cylindrical lens are shaped to match the cumulative lateral flux of the array of light emitting diodes with the cumulative lateral flux of a uniformly illuminated portion of a planar region.

BRIEF DESCRIPTION OF THE DRAWINGS

FIG. 7A shows a cross-section of a lens for illuminating a corner strip;

FIG. 7B shows said illumination;

FIG. 9A shows an asymmetric linear lens for illuminating a 1 meter shelf from 1' above its edge.

FIG. 9B shows same with rays.

FIG. 18A shows a top view of a linear lens system for providing a compromise illumination distribution over an area the size of a shelf in a supermarket freezer compartment

DETAILED DESCRIPTION OF THE CERTAIN PREFERRED EMBODIMENTS

Figure 1A:
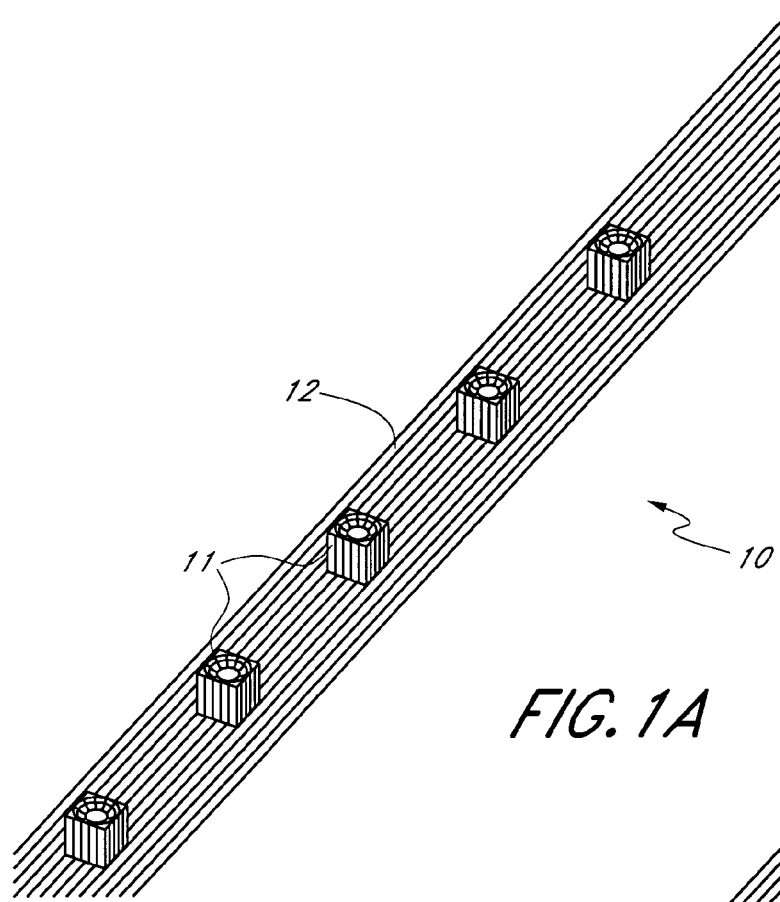
FIG. 1A is a view of a schematic linear array of tape-mounted LEDs.

In various embodiments described herein, lighting for commercial refrigeration is provided using light emitting diodes (LEDs). Such LEDs may be arranged in a series or array. In various embodiments, for example, a series of LEDs extend vertically along a door frame supporting a refrigerator door of a commercial refrigerator. Such a series of LED lights may illuminate products on a plurality of shelves within the refrigerator. These products may be visible to consumers through a glass window on the refrigerator door. In various preferred embodiments, the series of LEDs efficiently and uniformly illuminates the products.

As described above, low-cost LEDs on low-voltage tapes, spaced every 10-20 mm, are available from Osram Corporation under the 'Linear Flex' product line. A linear lens that extends across a plurality of LEDs may be used to distribute the light on the products. Provision of the LEDs as tape reels enable automated production wherein lengths of such LED tapes are installed into long extruded brackets, onto which long extruded lenses can be mounted over the tape's line of LEDs. Linear, or cylindrical lenses, are advantageous in comparison to individual dome lenses for such linear arrays because of the low cost of extruding the lenses in a transparent plastic such as acrylic.

Such extruded lenses, with their constant cross section, may be referred to as cylindrical lenses, also known as rod lenses. In contrast to cylindrical lenses used for imaging, various cylindrical lens designs are described herein that provide for desired illumination. In particular, in various embodiments, cylindrical lenses are designed as illumination lenses for a linear array of LEDs, and more particularly, designs are described that will produce uniform illumination on nearby flat surfaces.

Illumination lenses act to collect light from a source and gather it into a useful beam to cast upon a target. Frequently, uniform illumination is desired, but most often not attained. Sometimes this is because the target, such as a wide shelf, has widely varying distance and slant to the luminaire, so that even uniform intensity becomes non-uniform illumination. Thus, it is useful to tailor the intensity for uniform illumination, i.e., intensity is increased towards the more distant parts of the target, relative to the closest parts. This form of tailoring can be applied to circularly symmetric lenses individually mounted on each LED. Cylindrical lenses, however, are inherently more suitable for linear arrays of LEDs because they are far less costly to produce and install. Extrusion of plastic is far less costly than injection molding, and a single long lens is far less costly to mount and align than numerous individual lenses.

Accordingly, various embodiments disclosed herein relate generally to illumination lenses that produce uniform output-illuminance from a linear array of light sources such as LEDs. In particular, the various embodiments include several LED linear lenses providing marked improvements over the LEDs by themselves. These constant-cross-section lenses can be extruded inexpensively and cut to fit particular applications.

Linear lenses, however, are inherently difficult to tailor because they need to deal with out-of-plane rays, i.e., rays not lying in the plane of the lens profile (e.g., y-z plane in drawings discussed below), which is swept perpendicular to its plane to form the linear lens. These out-of-plane rays, which have an x component are called sagittal rays, while the in-plane rays are called meridional rays. Sagittal rays can behave differently from meridional rays because refraction is non-linear for large deflection angles, i.e., over 10°. Thus, the sagittal rays are refracted more than the meridional rays, and the image of a line source directed along the x direction is a curve, not a line, which complicates the lateral flux-control necessary for uniform illumination. In a converging lens, the width of the ends of such a curve bend inwards towards smaller off-axis angles, tending to increase the center of the distribution at the expense of the periphery, while the opposite happens with a diverging lens. Various embodiments described herein, however, include a way to adjust for these larger contributions at the center of the distribution, by repeating the lens iteration with inputs altered using feedback to adjust for departures from uniformity.

Such flux control begins with the angular shape or distribution of the source's light output. The LEDs on the above-mentioned Osram tapes are specified as having only small emission past 60° from the tape's surface normal due to a sunken emitter-chip, as well as Lambertian emission at lesser angles. This angular distribution is advantageous in that it greatly reduces overall sagittal range of the rays, and also in that it allows essentially all the flux to be intercepted by compact wide-angle lenses. For example, the above-mentioned LED tape has a 14 mm pitch, with 2.2 mm diameter emitting regions at the top of 2.2 mm high packages. Various linear lens embodiments described and depicted herein have a width of only 13 mm, and the tops of the various linear-lenses of that width have heights ranging from 9-12 mm above the tape surface. This height variation is for different target widths at a standard 1 foot distance over target-center.

The performance of the various lenses is to be compared with that of the tape alone. Positioned 1' over target center, the tape produces 20 ft-candles just below it and only 1.3 ft-c 6" to the side. A uniform illuminance is desirable across a range of target widths and orientations, as will be described below.

The sagittal-error effect described above, however, is significant only for lenses requiring large ray-deflections, i.e., those illuminating at f/1, or a 1' target at 1' distance. Illumination of nearby wide shelves is a wide-angle task not involving large ray-deflections. This enables uniform illumination to be attained with a single-pass calculation that proceeds from the edge of the lens, deriving the slope angles that refract central source-rays in accordance with the desired illumination pattern. The LED diameter of 2.2 mm is sufficiently small relative to the 13 mm lens width as to allow this small-source approximation.

In addition to lighting for commercial refrigeration, numerous embodiments are disclosed herein for a variety of everyday illumination tasks, as well as the algorithm that generated them. Shelf lighting, cove lighting, sign lighting, and strip lighting are possible applications. As a product it will have few parts and be easy to install as long continuous runs in the field.

With reference to FIGS. 1A-D, a length of an exemplary lighting system 10 is described. FIG. 1 shows a schematic of LED tape system 10 with LEDs 11 on thin electrified tape 12. The light source includes a plurality of light emitting elements 11 arranged spaced apart along a length of electrical cable or tape 12. The emitting elements may be, for example, white or colored light emitting diodes (LEDs) such as aluminum-gallium-arsenide-based red light emitting diodes, blue or blue/green nitride-based light emitting diodes, phosphor-coated UV light emitting diodes emitting white or other colored light, or the like. Alternatively, other light emitting elements such as miniature incandescent lamps may be used. Single light emitting elements may be spaced apart between about 10-40 mm, alternatively between about 20-30 mm, alternatively at a spacing of about 25 mm along the length of the tape depending upon the output distribution of the individual light emitting elements and the desired output intensity. For example, in the Osram Linear light Flex tape referenced above, single LEDs may be spaced approximately every 14 mm along the length of the tape. Clusters of one or more light emitting elements may be spaced apart along the length of the tape. Other spacings are possible.

Figure 1B:
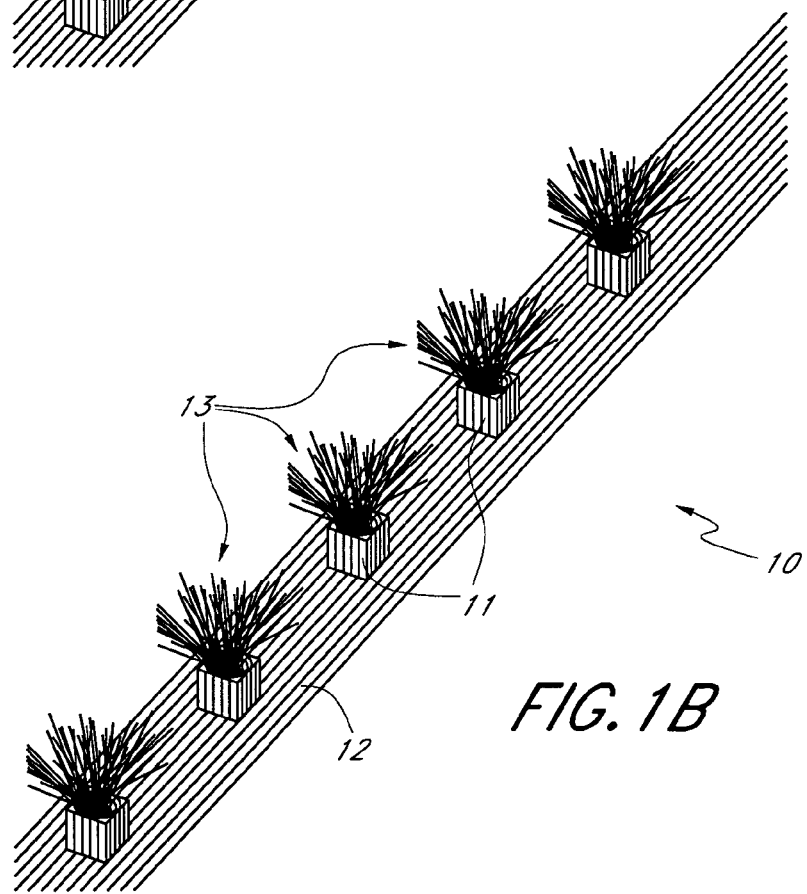
FIG. 1B shows same with Monte Carlo rays used for design validation.

FIG. 1B shows the LED tape of FIG. 1A with short Monte Carlo ray-segments 13 representing the output light distribution from each LED 12. Here, each of the LEDs 12 provide a substantially Lambertian distribution of the output light wherein the intensity of the light distribution is directly proportional to the cosine of the angle from which it is viewed. Such a Lambertian light source presents constant luminance at all viewing angles due to the variation in surface area with viewing angle, so that off-axis fall-off of a flat output aperture gives a cosine dependence of intensity.

Figure 1C:
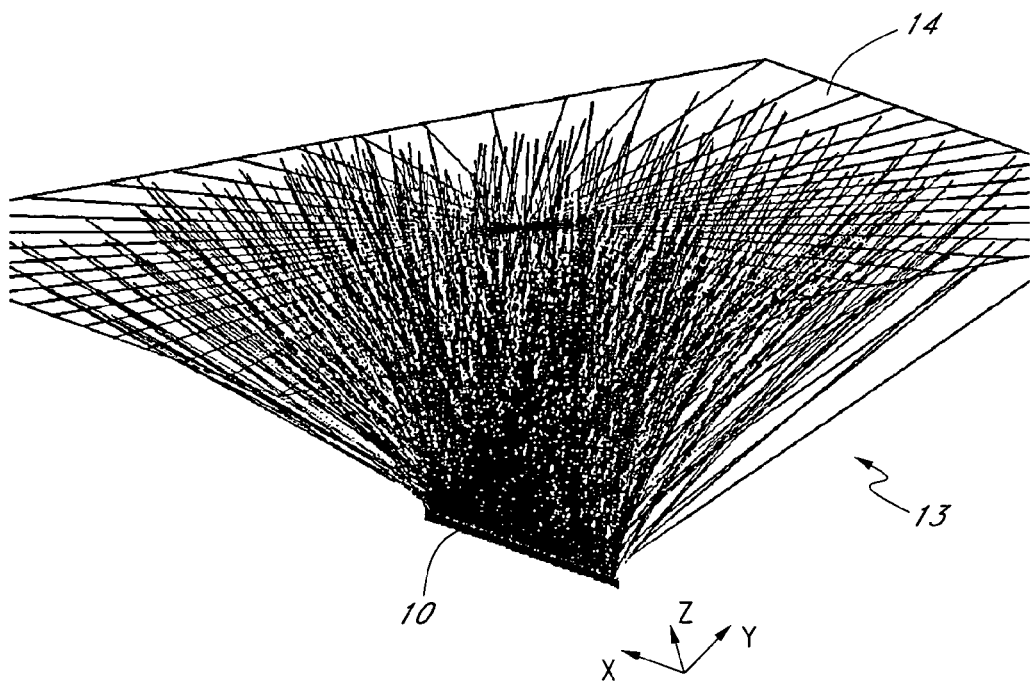
FIG. 1C is the same, but viewed from farther away to show rays hitting a target 1' above the LED tape.
Figure 1D:
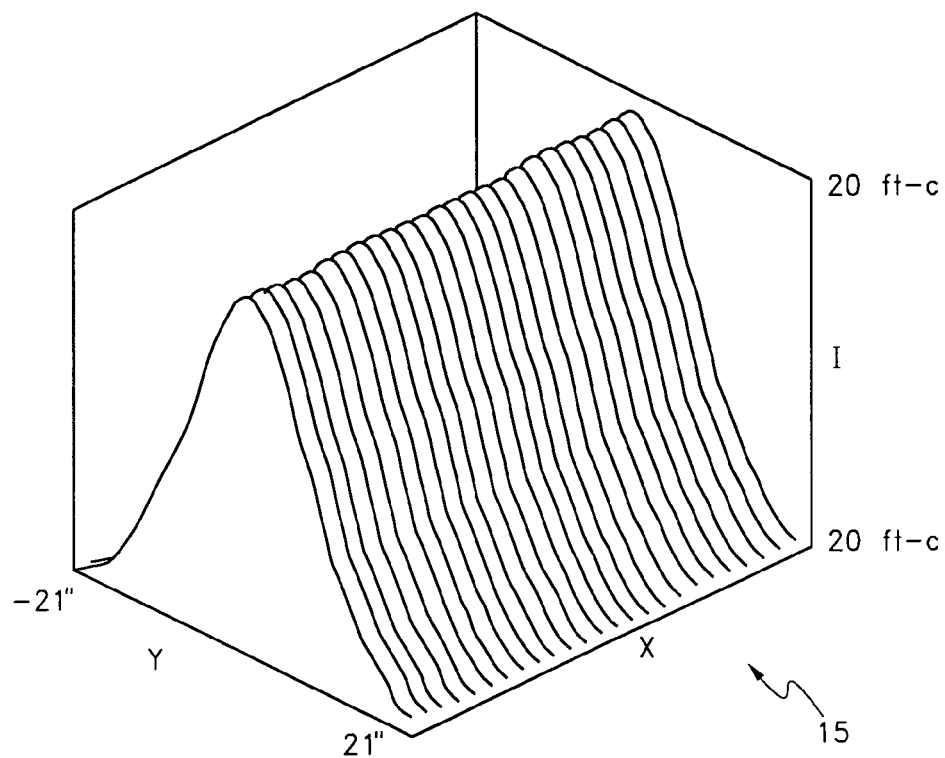
FIG. 1D is a graph of the highly nonuniform lateral distribution of target illuminance, assuming 1 cm spacing and 1 lumen per LED (for the sake of normalization)

FIG. 1C shows linear tape system 10 emitting rays 13 that propagate out to target 14 at 1' distance. Such would be the case where the tape system 10 is used to light the leading edges of a shelving system at close range, for example in a refrigerator or cold storage display case. As discussed above, the off axis fall-off of the light output resulting from placement of target 14 at a 1' distance results in a cosine dependent variation in intensity of light incident on the target 14. FIG. 1D shows 3-D illuminance plot 16 with height showing illuminance, I, in foot-candles across transverse dimension y of a target 1' from the tape. As can be seen, illuminance has a central peak of 20 ft-c but is very dim at the edge, where incidence angle is 60°. Thus, in use, the light tape 10 alone would provide extremely non-uniform lighting over the transverse length of the target. Various preferred embodiments remedy this extreme nonuniformity.

In certain embodiments, a linear illumination lens may be coupled with the light tape 10 to produce a uniform output-illuminance from the linear array of LEDs 11 spaced apart along the light tape 10. Such linear lenses may provide marked improvements in uniform distribution of the output light from the LED array when compared with the distribution of the LEDs by themselves. These illumination lenses act to collect light from the LED array and gather it into a useful beam to cast upon a target by tailoring the intensity. For example, to provide uniform illumination over a closely spaced wide target, the intensity may be increased towards the more distant parts of the target, relative to the closest parts.

As described above, linear lenses, however, are inherently difficult to tailor because they involve out-of-plane (sagittal) rays which have an x-component, i.e., rays not lying in the plane of the lens profile (in contrast to in-plane or meridional rays, which lie in the y-z plane). As referred to above, sagittal rays can behave differently from meridional rays because refraction is non-linear for large deflection angles, i.e., over 10°. Thus, the sagittal rays are refracted more than the meridional rays, and the image of a line source is a curve, not a line, which complicates the lateral flux-control necessary for providing uniform illumination. For converging lenses, the ends of such a curve bend inwards towards smaller off-axis angles, tending to increase the center of the distribution at the expense of the periphery, while the converse obtains for diverging lenses. However, the linear lens may be adjusted for these crossover terms by repeating the lens iteration with inputs altered, via feedback, to adjust for departures from uniformity, although possibly resulting in a more prolonged transverse cutoff at the edge of the pattern.

In certain embodiments, designing the cylindrical lens to provide the required lateral flux control begins with the angular distribution of light emitting source's light output. For example, as described above, the LEDs on the above-mentioned Osram Linear light Flex tapes are specified as having only small emissions past 60° from the tape's surface normal, as well as Lambertian emission at lesser angles. This distribution is advantageous in that it greatly reduces overall sagittal range of the rays, and also in that it allows essentially all of the flux from the LEDs to be intercepted by a compact wide-angle lens. For example, the above-mentioned LED tape has a 14 mm pitch, with 2.2 mm diameter emitting regions at the top of 2.2 mm high packages. (Certain embodiments of a cylindrical lens for use with such a light tape may have a width of about 13 mm, and a top surface with a height ranging from about 9-12 mm above the tape surface. For a standard 1 foot distance from target-center, the thickness of the cylindrical lens above the light tape may be adjusted for different target widths.)

Usually the intensity distribution of the LEDs is given as a function of off-axis colatitude angle $\theta$, implicitly describing a two-dimensional, circularly symmetric distribution of light into annular strips between colatitudes $\theta$ and $\theta+d\theta$. For various embodiments of the present invention, the one-dimensional transverse intensity distribution of the linear array of LEDs (e.g. in a y direction) is a function of the lateral off-axis angle $\alpha$ (measured with respect to the z-axis), into y meridional differential linear strips (parallel to the y-direcction) between transverse angles $\alpha$ and $\alpha+d\alpha$. The cylindrical lens may then be designed to laterally redistribute the radiation incident on these strips so as to uniformly illuminate the target.

Figure 2A:
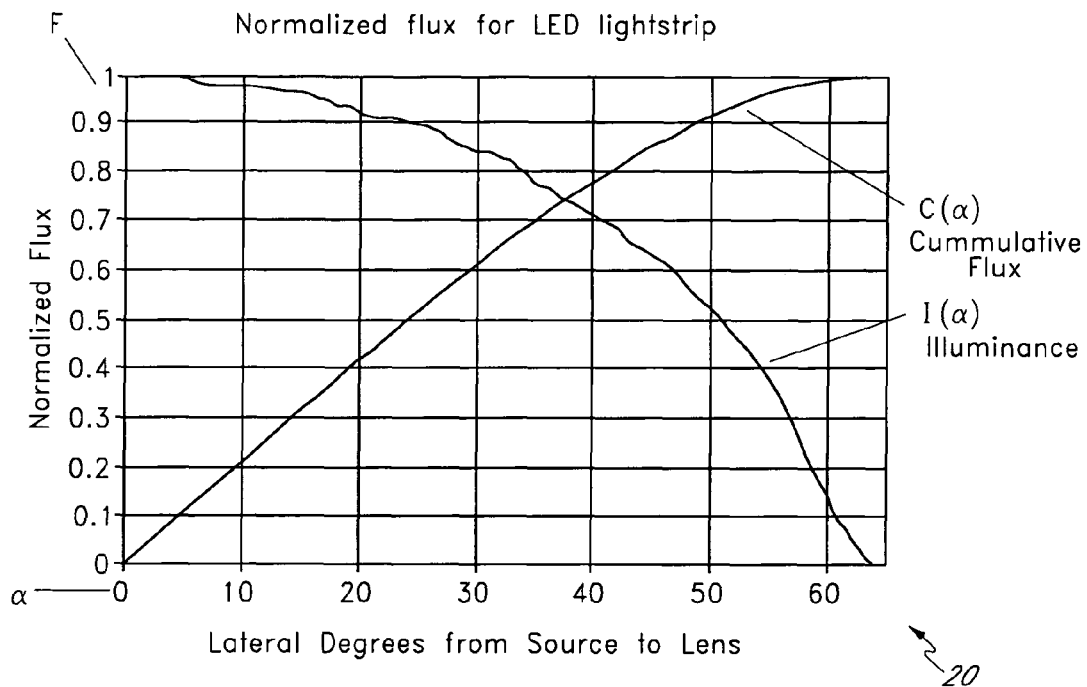
FIG. 2A is a graph of the angular distribution of light from the tape.

FIG. 2A shows a graph of normalized flux for an LED on the above described light tape, with abscissa, $\alpha$, representing the transverse, or lateral, angle from the LED and ordinate, F, representing the normalized flux ranges from 0 to 1. Illuminance I($\alpha$) is seen to fall off strongly, disappearing at 64°, slightly past the LED's 60° limit due to its finite size at the bottom of the lens. The irregularity is a result of the Monte Carlo simulation that provided the data. Cumulative flux C($\alpha$) $=\int_0^\alpha I(\Psi) \sin \Psi \, d\Psi / \int_0^{90} I(\Psi) \sin \Psi \, d\Psi$ is shown increasing monotonically. Designing the cylindrical lens to uniformly redistribute this light involves matching this function with a like one for the target illuminance.

Figure 2B:
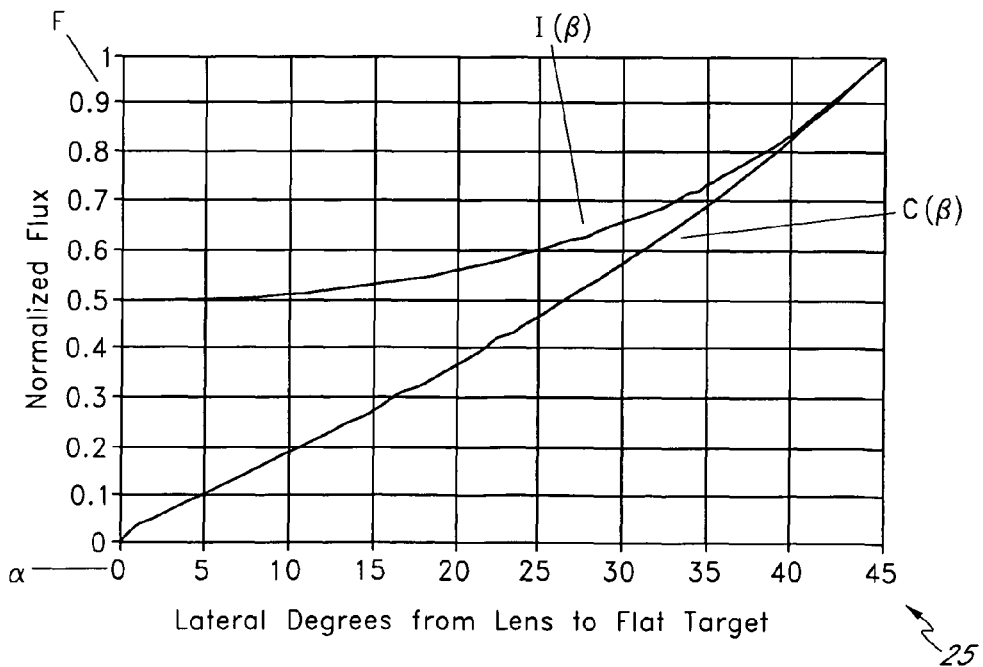
FIG. 2B is the corresponding graph of the angular distribution of light to a target.

FIG. 2B shows a similar graph 25, but with abscissa $\beta$, the transverse angle (e.g., defined with respect to the optical axis for rays in the x-z plane) from lens to a planar target, which laterally subtends ±45°. Intensity I($\beta$) equals $\cos^{-2}\beta$, which gives uniform illuminance on target. The desired cumulative flux C($\beta$) at the target is also shown.

One design approach to producing the desired output distribution at the target, is to determine the local deflection needed at each point on the lens profile in order to match the cumulative source distribution with the cumulative target distribution. In this manner, a lens may be obtained to produce the cumulative target distribution, C($\beta$), from the cumulative source distribution, C($\alpha$).

In particular, at any given transverse LED-exit angle $\alpha$, there is a cumulative flux value C($\alpha$) at the lens. There is also a corresponding angle $\beta$ that yields cumulative flux value C($\beta$) equal to that cumulative flux value C($\alpha$) at the lens. Each different $\alpha$ value is related to its suitable value of $\beta$ through a function $\beta(\alpha)$. Thus, the values of $C(\alpha)$ yield a function $\beta(\alpha)$ where the flux-matching condition $C(\beta)=C(\alpha)$ is satisfied. The lens can be designed to deflect every central ray from $\alpha$ to $\beta$ according to this function $\beta(\alpha)$ to satisfy the flux-matching condition $C(\beta)=C(\alpha)$, and thereby produce the target flux distribution $I(\beta)$ from the source flux distribution $I(\alpha)$.

In various preferred embodiments, the small-source approximation, the basis for using linear calculations as described above, limits lens size to about 6-7 times emitter width. For example, in certain embodiments having a linear array of LEDs with a 2.2 mm emitter diameter, the linear lens may have a 13 mm aperture.

Accordingly, using the above graphs, an elongate, cylindrical lens may be designed to deflect every central ray from $\alpha$ to $\beta$. In various preferred embodiments, the cylindrical lens has a lower or rear curved surface and an upper or front curved surface, the combination of which redistributes any light incident thereon. These surfaces may be shaped such that the combination of the front and rear surfaces deflects every central ray from $\alpha$ to $\beta$. In particular, in certain embodiments, designing the profiles for the rear and front surfaces of a cylindrical irradiance redistribution lens begins with the assumption that the two surfaces equally share the total deflection $\alpha-\beta$, since aberrations are non-linear and the total aberration is minimized when the two deflections are equal. In the case of large deflections, however, out-of-plane rays could be totally internally reflected upon exiting, leading to a greater amount of detection being assigned to the inner surface.

This principle of lens shaping does not preclude shape variations from those shown herein, such as slight shape variations in order that one surface-profile (usually the bottom, or rear, surface) may assume a convenient shape, such as a flat plane or a concave curve of constant radius. Similarly, the top surface may dip at the center, when the extruder would find a flat surface more convenient. Nor are precluded any other "nearby" shapes derived by curve-fitting the numerically derived surfaces disclosed herein. That is, it may be convenient to sacrifice a little uniformity for a particular surface-profile to be attained, perhaps for manufacturing convenience particularly regarding post-extrusion thermal contractions.

The suitable lens profiles depicted herein are generated by a differential equation relating the bottom-surface coordinates to the slope angle of the bottom surface, via the bottom-surface deflection angle $\frac{1}{2}(\alpha-\beta)$, or a greater fraction than $\frac{1}{2}$, as previously discussed.

Figure 3A:
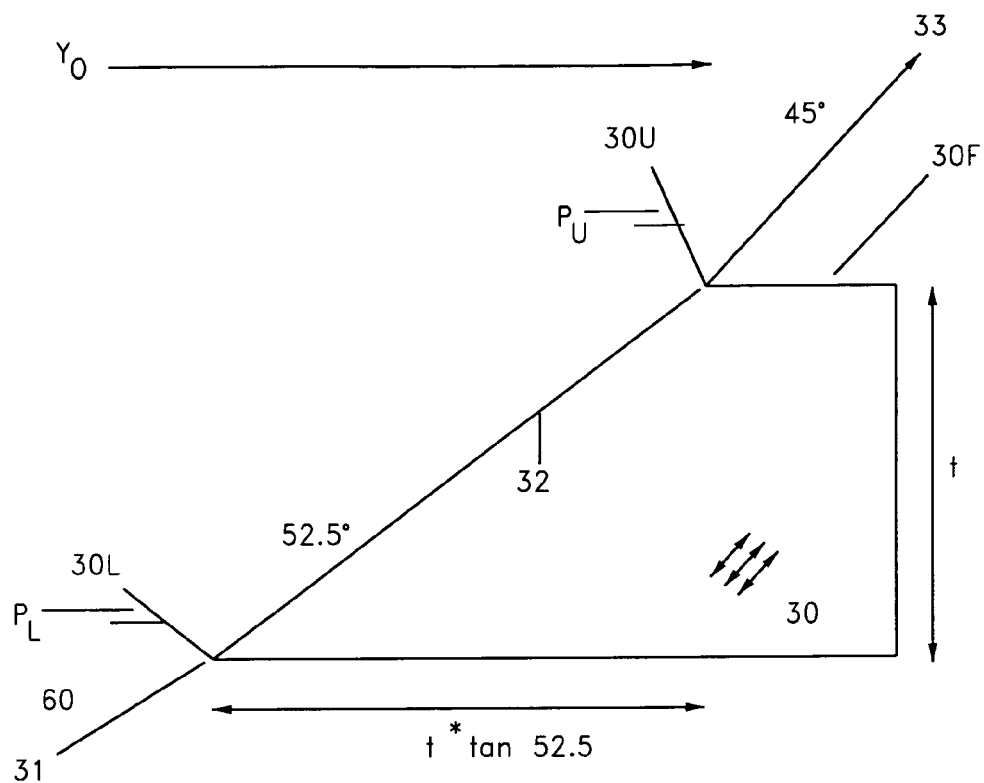
FIG. 3A shows the first step in calculating the lens profile.

With this deflection function $\beta(\alpha)$ obtained from the cumulative-flux data, the lens profile can be calculated by the method of FIG. 3A, which is a close-up view of the edge of irradiance-redistribution lens 30, in the vicinity of flange 30F, showing lower surface profile 30L and upper surface profile 30U. The mathematical generation of lower surface 30L begins with its outer edge, where extreme central ray 31 defines $\alpha=60°$. Lower surface 30L has slope $\rho_L$, which refracts ray 31 into internal ray 32, defining $\theta=52.5°$. Upper surface 30U has slope $\rho_U$, which refracts ray 32 into external ray 33, defining $\beta=45°$.

Figure 3B:
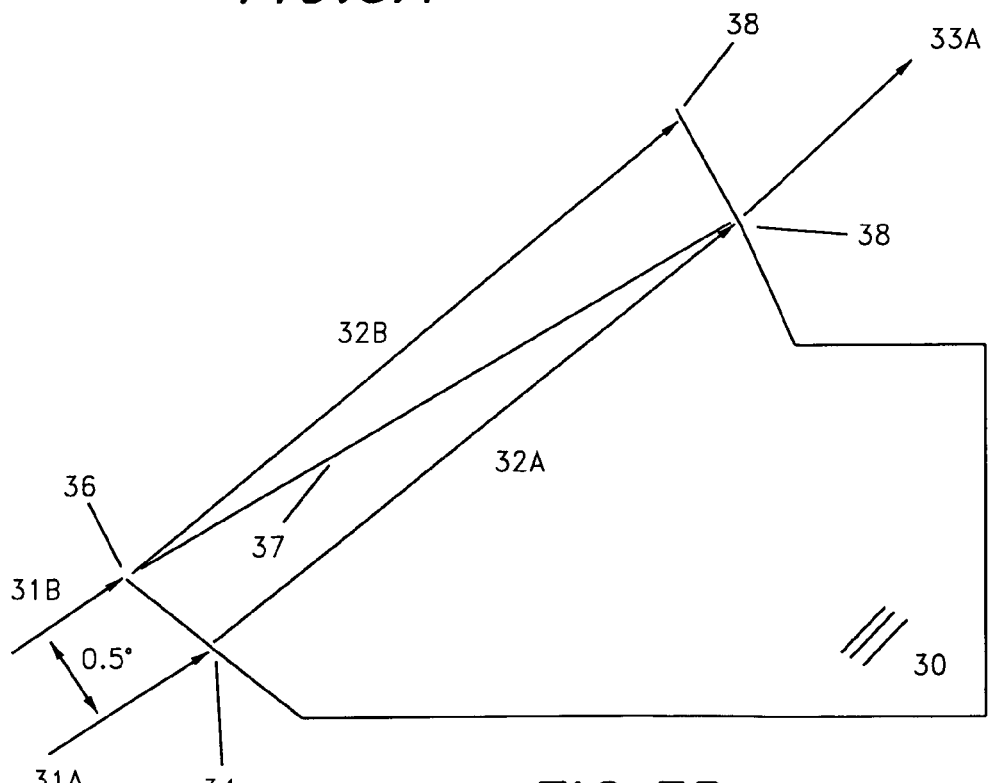
FIG. 3B shows how each subsequent step follows the previous one.

FIG. 3B shows lens profile 30, with previously calculated lower-surface point 34 and corresponding central ray 31A. Central ray 31B is 0.5° inside ray 31A, enabling next lower-surface point 36 to be calculated by the law of sines and the triangle formed by the origin (not shown) and points 34 & 36.

Internal ray 32B has known inclination $\theta=\frac{1}{2}(\alpha+\beta(\alpha))$. Once point 36 is located, its distance from known point 35 is indicated by line-segment 37. Then point 38 can be located by the law of sines as applied to the triangle it forms with points 35 & 36.

By using small intervals, smooth upper and lower surfaces can thus be mathematically iterated from the periphery to the center, with different resultant shapes dependent upon the size and distance of the illumination target. For example, depending upon the target width and distance from the lens, the surfaces may be shaped to form a negative optical power for deflecting incident rays outward or alternatively a positive optical power for focusing incident rays. In certain embodiments, the lens may have certain sections which form a negative lens and other sections which form a positive lens.

Figure 4A:
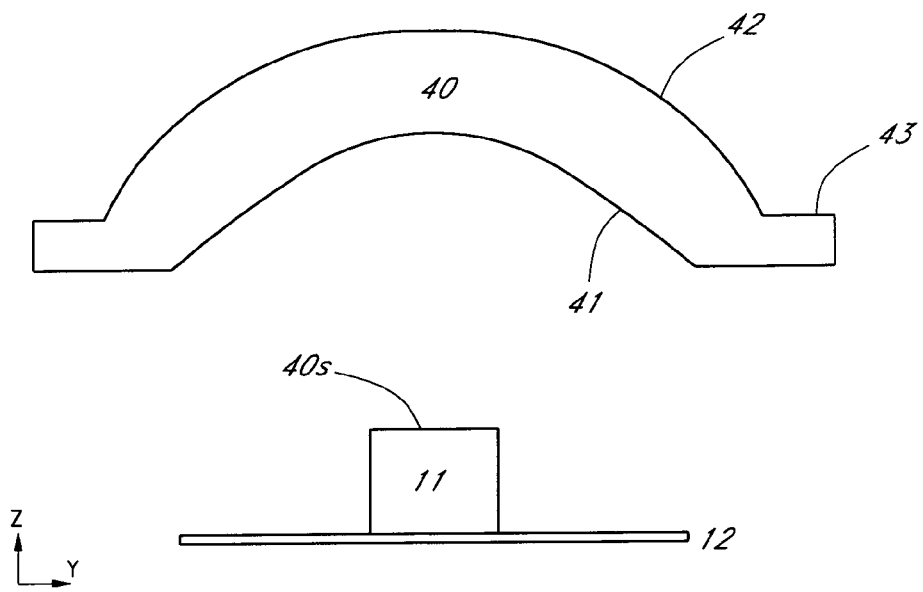
FIG. 4A is a cross-section of a ±45° lens positioned above the LED and tape.
Figure 4B:
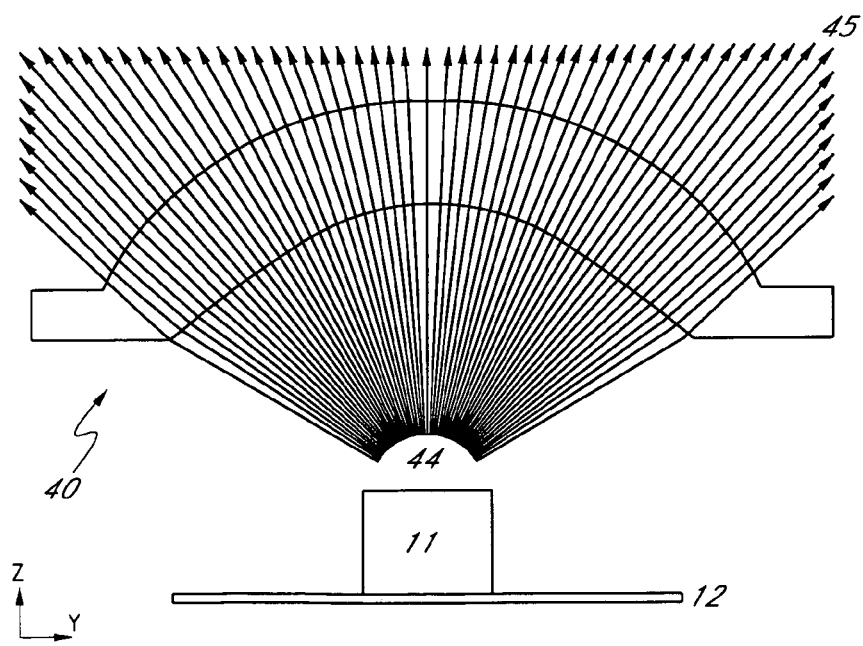
FIG. 4B shows same with central rays.

FIGS. 4A-B show the result of continuing the lens-iteration process illustrated by FIG. 3B. Lens profile 40 comprises lower concave surface 41, upper convex surface 42, and flange 43. The lens is positioned relative to point 40s at the center of the emitting top of LED 11, mounted on tape 12. Planar ray-fan 44 subtends $\pm 60°$ and is refracted into exiting fan 45, subtending $\pm 45°$ and flux-distributed via the above-discussed function $\beta(\alpha)$ so as to provide uniform target illumination.

Figure 4C:
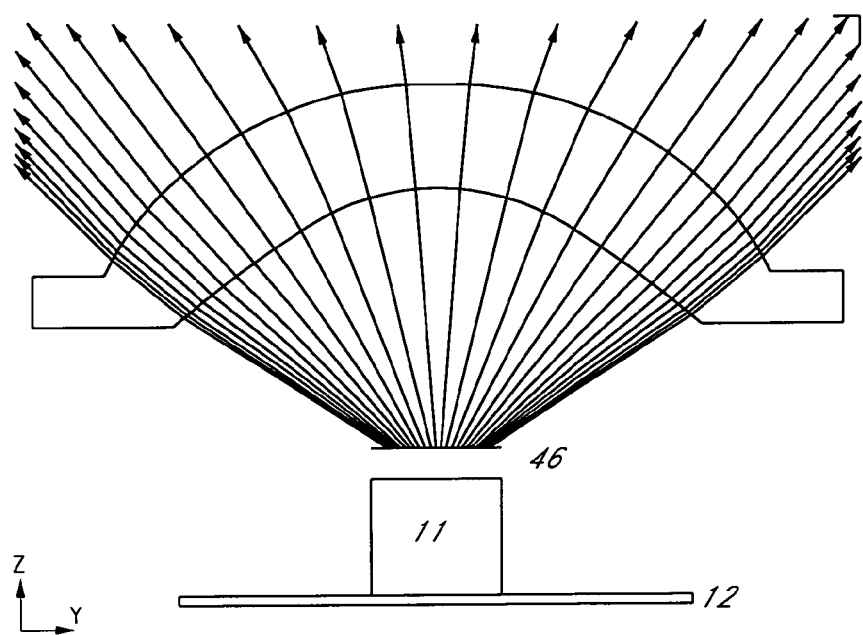
FIG. 4C shows same with a cone of 60° rays.

Since the largest single-surface deflection by this lens is only 7.5°, the sagittal error is small. FIG. 4C shows lens profile 40, and ray-cone 46 of 60° out-of-plane central rays from LED 11. Their deflections differ little from those of planar rays in FIG. 4B.

Figure 4D:
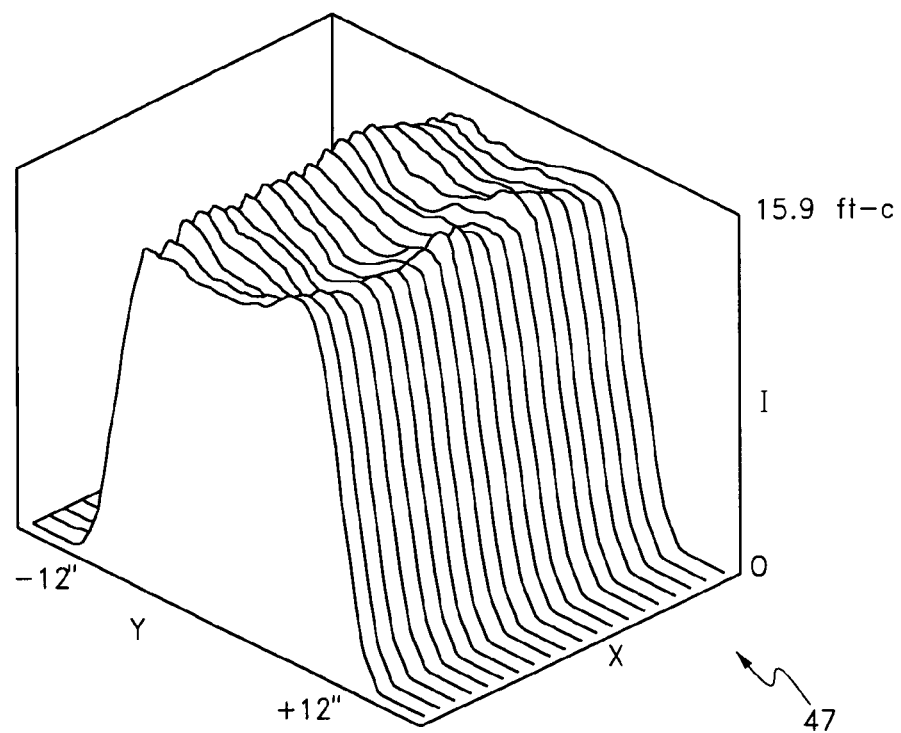
FIG. 4D shows the resulting target illuminance distribution, to be compared with FIG. 1D.

FIG. 4D shows a 3-D graph 47 of target illuminance provided by linear lens, showing a very uniform 16 ft-c illuminance across the 2' span of the target, with a tight drop-off beyond it. Note the large difference from FIG. 1D of the bare LEDs.

Figure 5A:
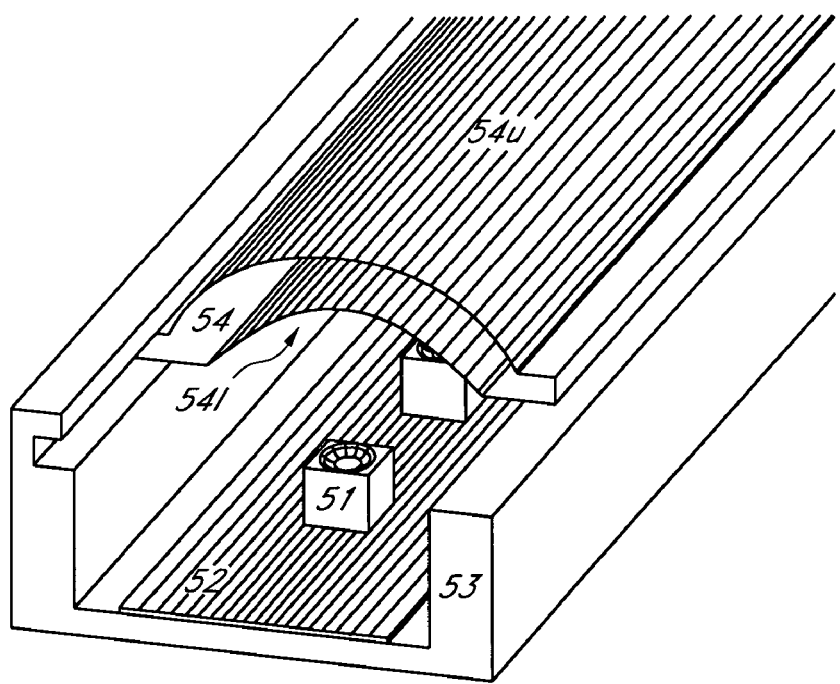
FIG. 5A is an external view of a complete linear-lens installation.

FIG. 5A shows one embodiment of a linear lighting system 50 comprising a linear array of LEDs 51 spaced apart along a low voltage tape 52. The tape 52 is mounted on an extruded bracket 53 (cutaway on right) which holds a linear lens 54 in position over the array of LEDs 51. The linear lens 54 comprises a lower surface 54L which is visible below upper surface 54U. It can be seen that this lens has small but useful thickness variation across the width of the lens, quite unlike conventional rod lenses.

Figure 5B:
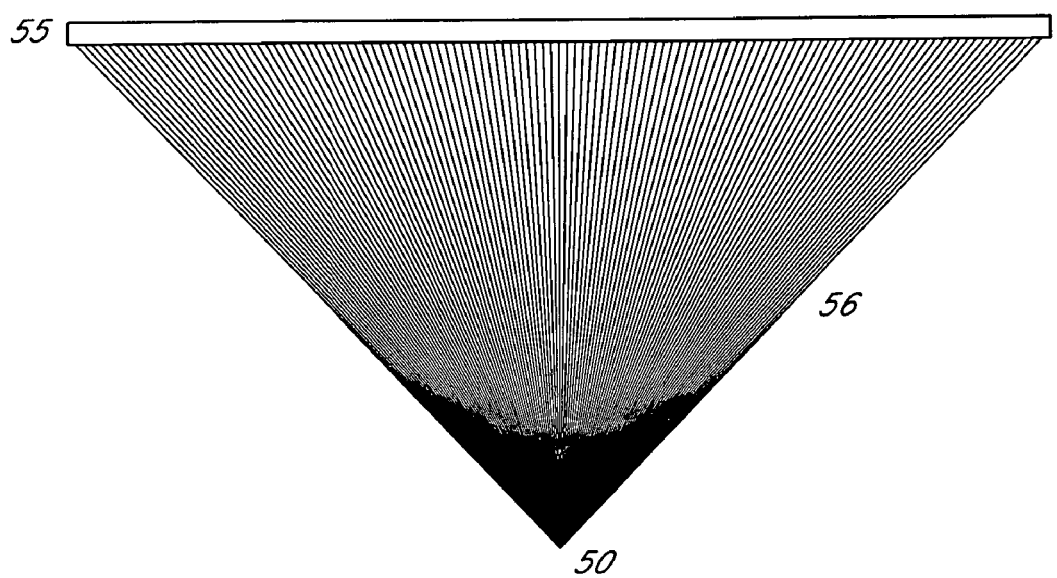
FIG. 5B shows same illuminating its 2' target from 1' above its center.

FIG. 5B shows a cross section of system 50 in action, illuminating target 55 with irradiance-mapped rays 56. Here, light from the LEDs 51 is transmitted through the cylindrical lens 54. The light rays 56 are refracted as they pass through the lower surface 54L and then again as they pass through the upper surface 54U of the lens such that the light exiting from the cylindrical lens 54 is uniformly distributed over the surface of target 55. The shape of the upper and lower surfaces of the cylindrical lens may be designed using the method discussed above depending on the desired distance between the target 55 and the light system 50, as well as on the width of target 55.

Figure 6A:
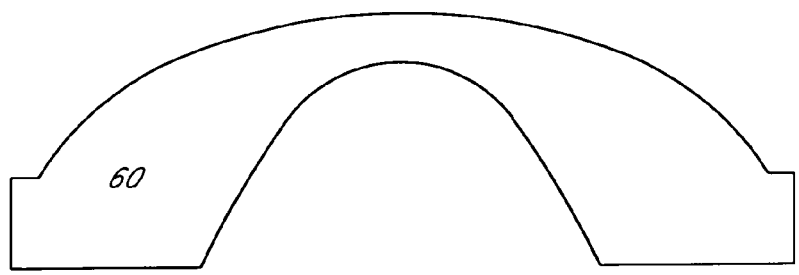
FIG. 6A shows the cross-section of a thinner, wider-angle linear lens that illuminates a 1 meter wide shelf from 1' above its center.

Other illumination situations can be addressed with equal facility. FIG. 6A shows the unconventional-looking cross-section of cylindrical lens 60, positioned above LED 61.

Figure 6B:
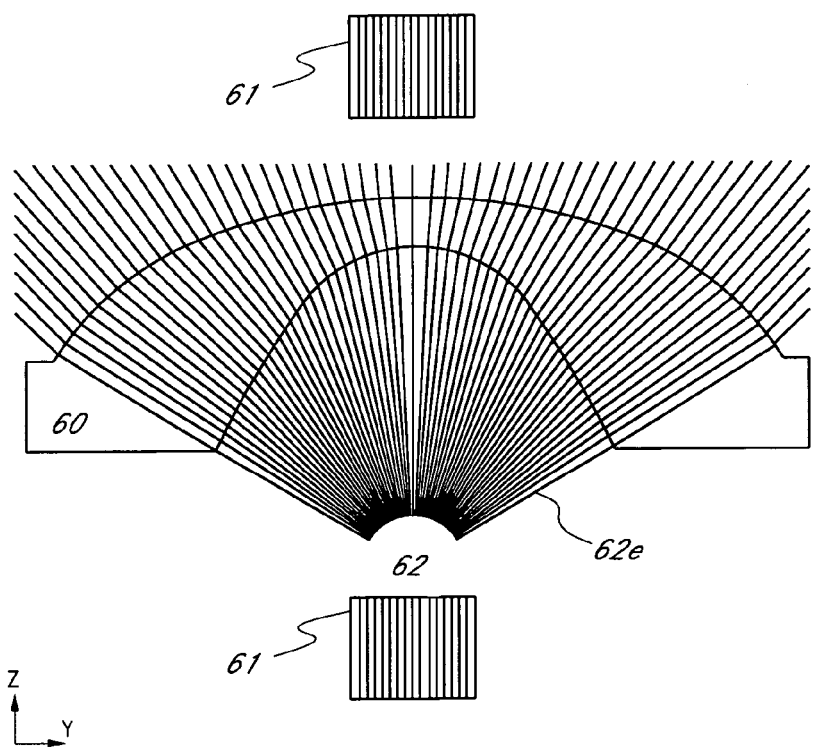
FIG. 6B shows same with central rays.
Figure 6C:
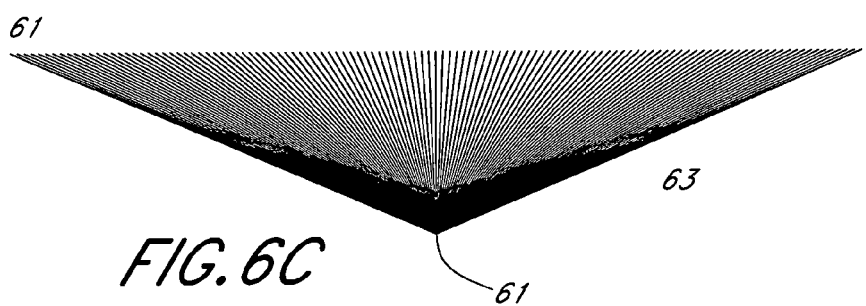
FIG. 6C shows same illuminating target.

FIG. 6B also shows planar ray-fan 62 deflected through an alternative embodiment of a cylindrical lens. Here, the cylindrical lens is designed such that the extreme ray 62E passes undeflected through the cylindrical lens. Most other rays are deflected outwards, making this a negative lens. Its wide-angle illumination action is shown in FIG. 6C, showing the lens at 60 emitting rays 63 on target 64, which is 1 meter wide at 1 foot above the light at point 60.

FIG. 7A shows the cross-section of linear lens 70, resembling lens 40 of FIG. 4A in that it has $\pm 45°$ output, but distributed differently. FIG. 7B shows lens and LED 71 in a corner position and tilted 45°, uniformly illuminating perpendicular corner-walls 72 & 73.

Figure 8A:
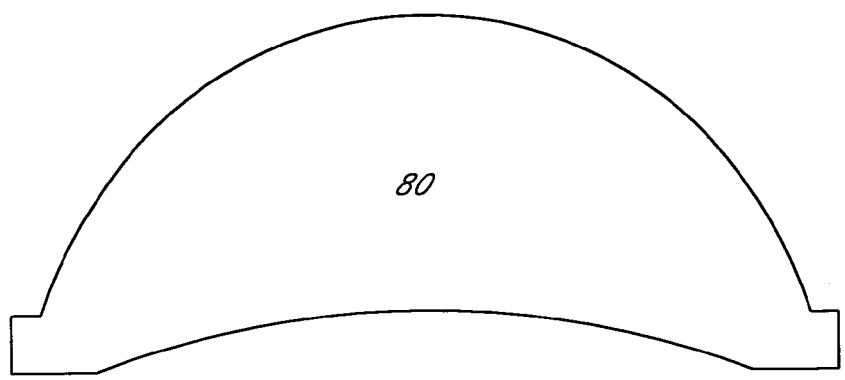
FIG. 8A shows a narrow-angle linear lens for illuminating a 1' shelf from 1' above its center.
Figure 8B:
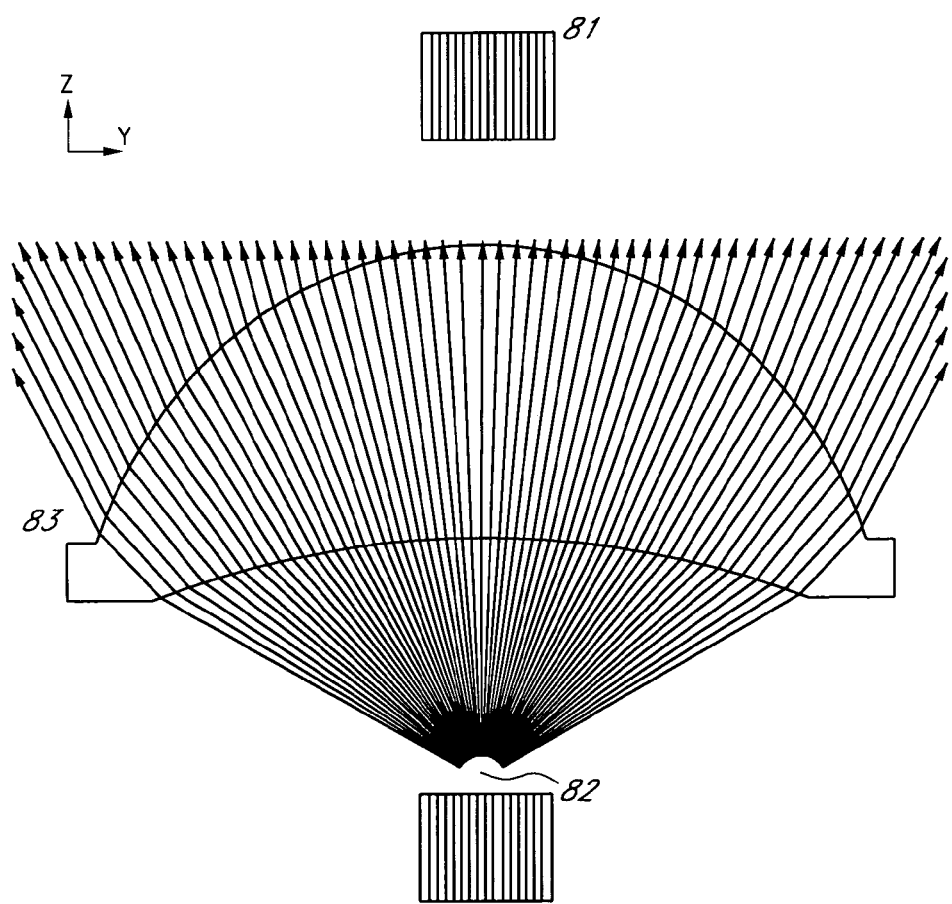
FIG. 8B shows same with rays.

FIG. 8A shows the cross-section of a thicker, narrower-angle (f/1) linear lens 80 positioned above LED 81. FIG. 8B shows planar ray-fan 82 being refracted into ±26° output fan 83, distributed to uniformly illuminate a 1' shelf from 1' distance over its center. Sagittal error causes some light to "leak" to smaller values of Z, requiring a slight modification to the β(α) function.

Circularly-symmetric lenses are necessarily left-right symmetric, but linear lenses are not. In fact, certain embodiments of asymmetric linear lenses are disclosed herein for asymmetric illumination geometries. The above-mentioned 1', 2', and 1 meter targets at 1' distances can as easily be illuminated from one edge in a similar manner as the above-disclosed lenses are illuminated from over the center of the target.

Figure 9C:
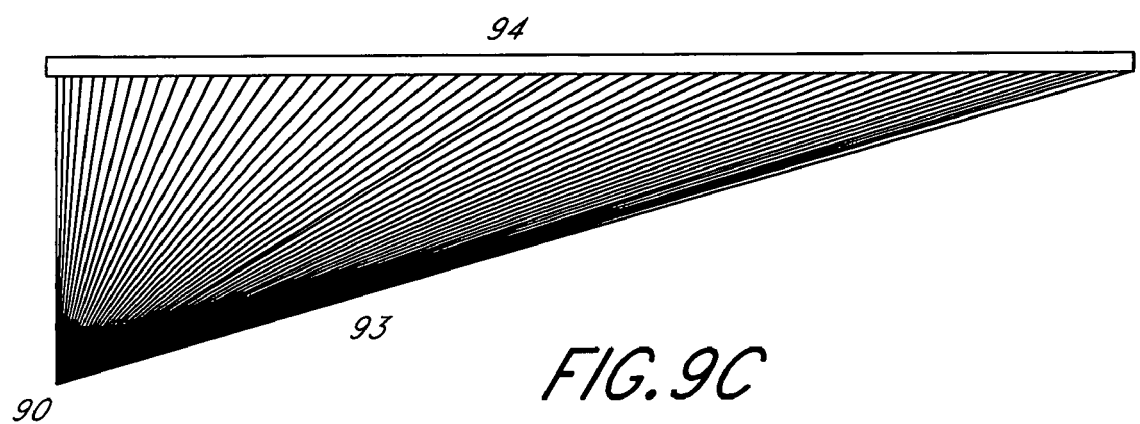
FIG. 9C shows same illuminating a 1 m wide shelf from 1' over its edge.

FIG. 9A shows asymmetric illumination lens 90 positioned over LED 91. Lens 90 has two quite dissimilar halves 90L and 90R. The coordinated action of these two halves can be seen in FIG. 9B, showing the refractive deflection by lens 90 of planar ray-fan 92, transforming it into asymmetric output fan b. FIG. 9C shows lens 90 illuminating 1-meter-wide target 94 from 1' above one edge, with output ray-fan 93. As in FIG. 7B, lens 90 is tilted, in this case to the right. The only mathematical difference is that the angles α and β can now take negative values, with β=θ−36.5, and θ=atan (y/H), with lateral coordinate y measured from beneath the source at height H. Such designs can be used to provide asymmetric illumination.

In certain embodiments, situations may arise wherein the target may have more than one possible target distance such that the capability to provide uniform illumination at multiple distances may be desired. For example in commercial refrigeration, the refrigerator compartment and the door assembly, including a lighting system mounted thereon, are typically manufactured separately. At the time of installation, the customer may choose to position shelves within the refrigerator compartment at one of several distances relative to the door assembly. Accordingly, a lighting system that provides illumination that works at either distance is advantageous. While perfectly uniform illumination is not necessarily provided for both shelf distances, a compromise between the two is possible that provides illumination substantially more uniform than that of fluorescent tubes, which produce a peaked distribution such as shown in FIG. 1A.

Figure 10:
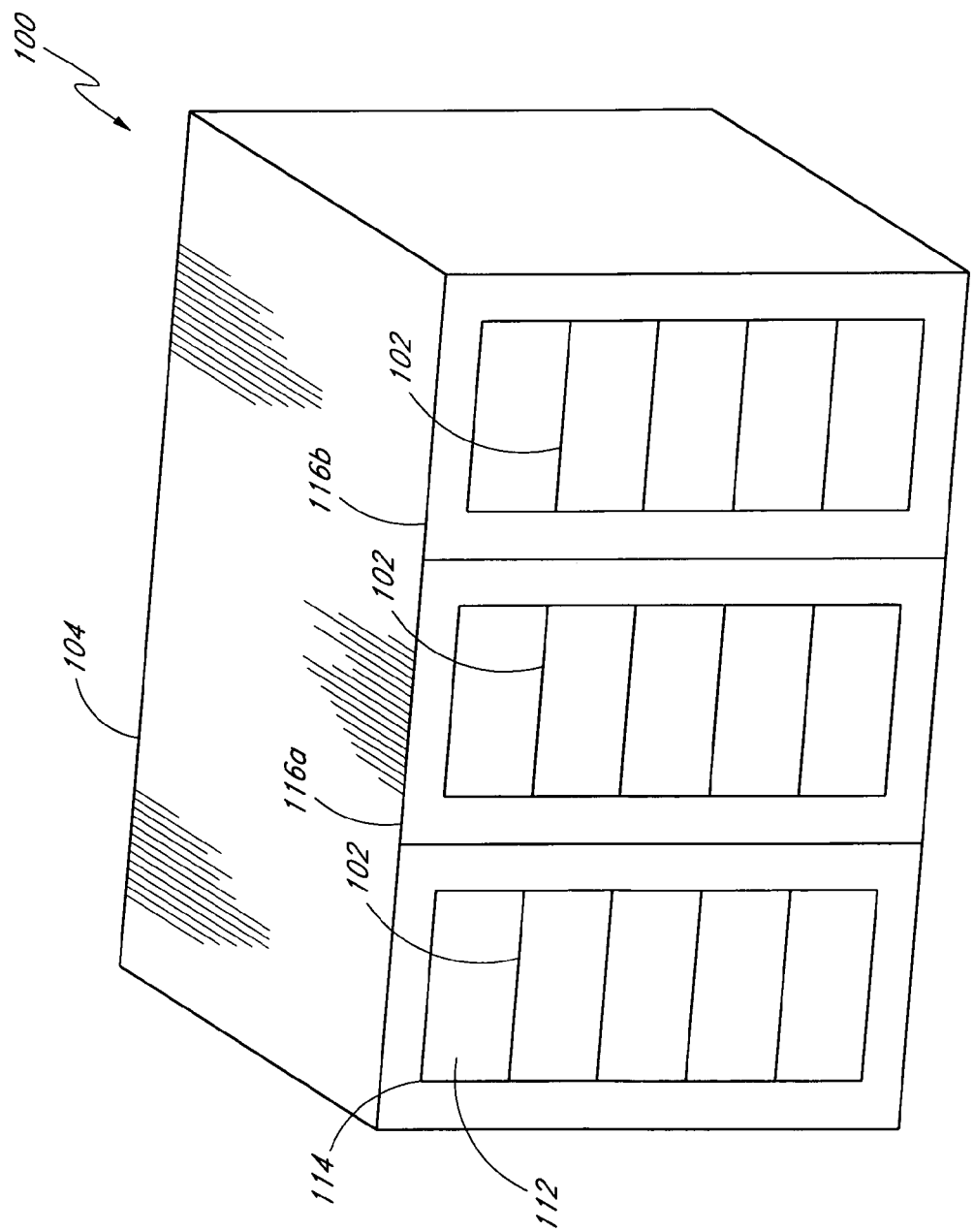
FIG. 10 is a front view a supermarket freezer compartment.
Figure 11:
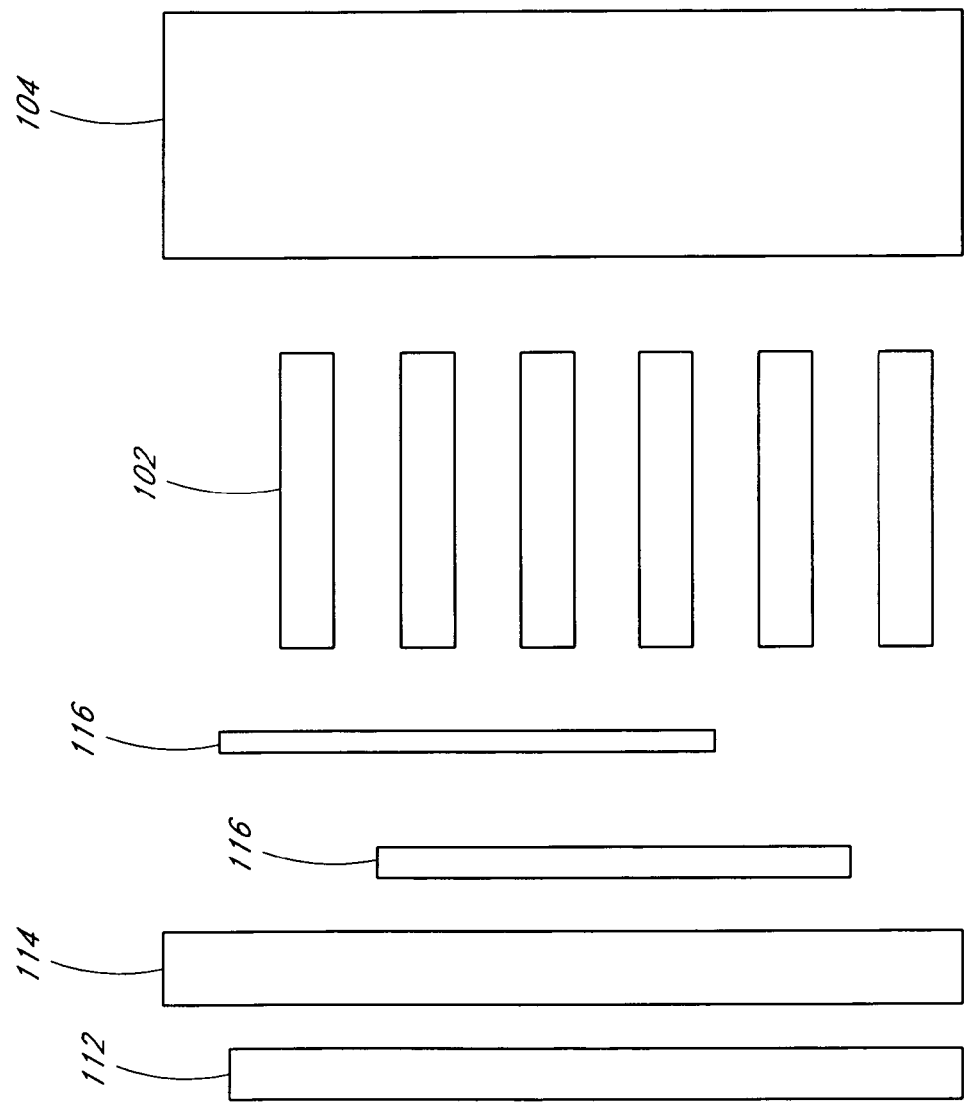
FIG. 11 is an exploded view of a supermarket freezer compartments.
Figure 12:
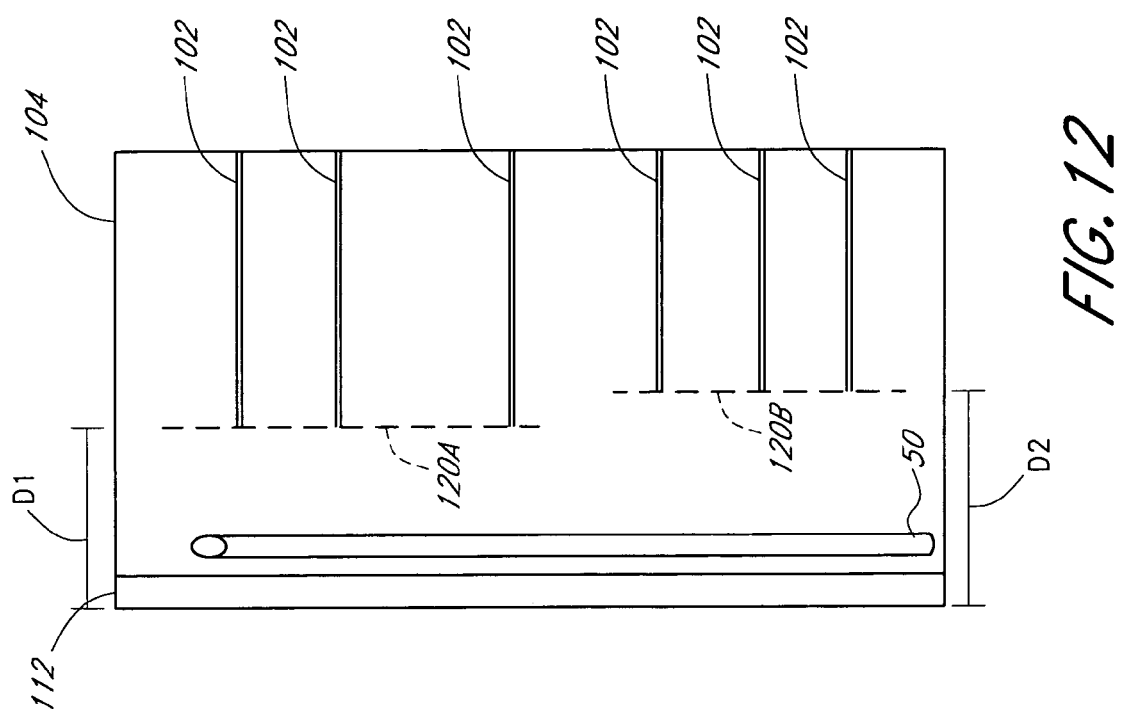
FIG. 12 is a cross-sectional view of a supermarket freezer compartment containing two types of standard shelves.

For example, as depicted in FIGS. 10-12, the cold storage compartments or refrigerators used in warehouse clubs, grocery stores, floral shops, deli cases, meat counters, convenience stores, drug stores and ice cream parlors, etc., typically have one or more display doors 112 showcasing the merchandise stored on one or more shelves 102 positioned within the refrigerator compartment 104. The refrigerator assembly 100 may comprise a refrigerator compartment 104 having a cooling system including a compressor for maintaining a desired temperature within the compartment. A door assembly 110 may be mounted on one end of the refrigerator compartment 104 for holding one or more transparent, double glazed display doors 112 extending the width of the refrigerator compartment and providing access into the refrigerator compartment 104. The one or more display doors 112 are mounted on a door frame 114. The door frame 114 may comprise a single frame extending the width of the refrigerator compartment 104 and having multiple mullion frames 116 (i.e. the vertical frames dividing adjacent refrigerator compartments 104) spaced apart for attaching multiple doors 112 to the refrigerator compartment 104. Alternatively, each door 112 may have a separate frame for attaching the door 112 to the refrigerator compartment 104. The number of doors 112 may depend upon the width of the refrigerator compartment 104 and the width of the individual doors 112. In certain embodiments, the doors may have a width of between about 23 to 30 inches. As shown in FIG. 10, the refrigerator assembly may have a width such that three doors 112 are used. In alternative embodiments, the refrigerator compartment may include more or less doors to extend the full width of the refrigerator compartment.

In addition, the refrigerator compartment 104 may have one or more shelves 102 positioned within the compartment 104 for storing and displaying the merchandise within the refrigerator compartment 104. The one or more shelves 102 are spaced apart vertically along the height of the refrigerator compartment 104. In certain embodiments, between 5-7 shelves may be spaced apart along the height of the refrigerator compartment. However, depending upon the height of the refrigerator compartment and the spacing needed between the shelves, more or less shelves may be provided. The shelves 102 may be from 24-36" deep. Typically, the shelves 102 are between about 23-30 inches wide. The width of the shelves 102 may correspond to the width of the display door 112. Alternatively, the shelf width may be greater or smaller than the width of the door.

As shown in FIG. 12, the door frame 114 has at least one lighting strip 50 mounted vertically along the length of the frame 114 for providing illumination across the shelves 102. As discussed above, and shown in FIG. 5A the lighting strip 50 may include a length of tape 52 having a plurality of LEDs 51 arranged along a length of the tape 52. An elongated cylindrical lens 54 may be mounted over the length of the tape 52 or a portion such that the lens 54 covers the LEDs 51. The lighting strip 50 may have a length corresponding to the interior height of the refrigerator compartment in order to fully illuminate the compartment. For example, in certain embodiments wherein the refrigeration compartment has a height of between about 65-80 inches, the lighting assembly may have a length of about 63-78 inches so that the entire height of the refrigerator compartment or the portion visible through the window is illuminated. As discussed above, the LEDs 51 may be spaced apart along the length of the tape 52. The space between LEDs and thus the number of LEDs mounted on the tape may vary depending upon the number of shelves within the refrigerator compartment and the illuminance desired. The elongated cylindrical lens 54 is shaped to disperse the illumination from the LEDs across the front edges of the shelves mounted in a refrigerator compartment.

In certain embodiments, such as in FIG. 10, where more than one display door is provided to cover the refrigerator compartment opening, more than one lighting strip may be mounted along the mullion frame 116 of the door frame for illuminating the entire width of the refrigerator compartment 104.

Figure 13:
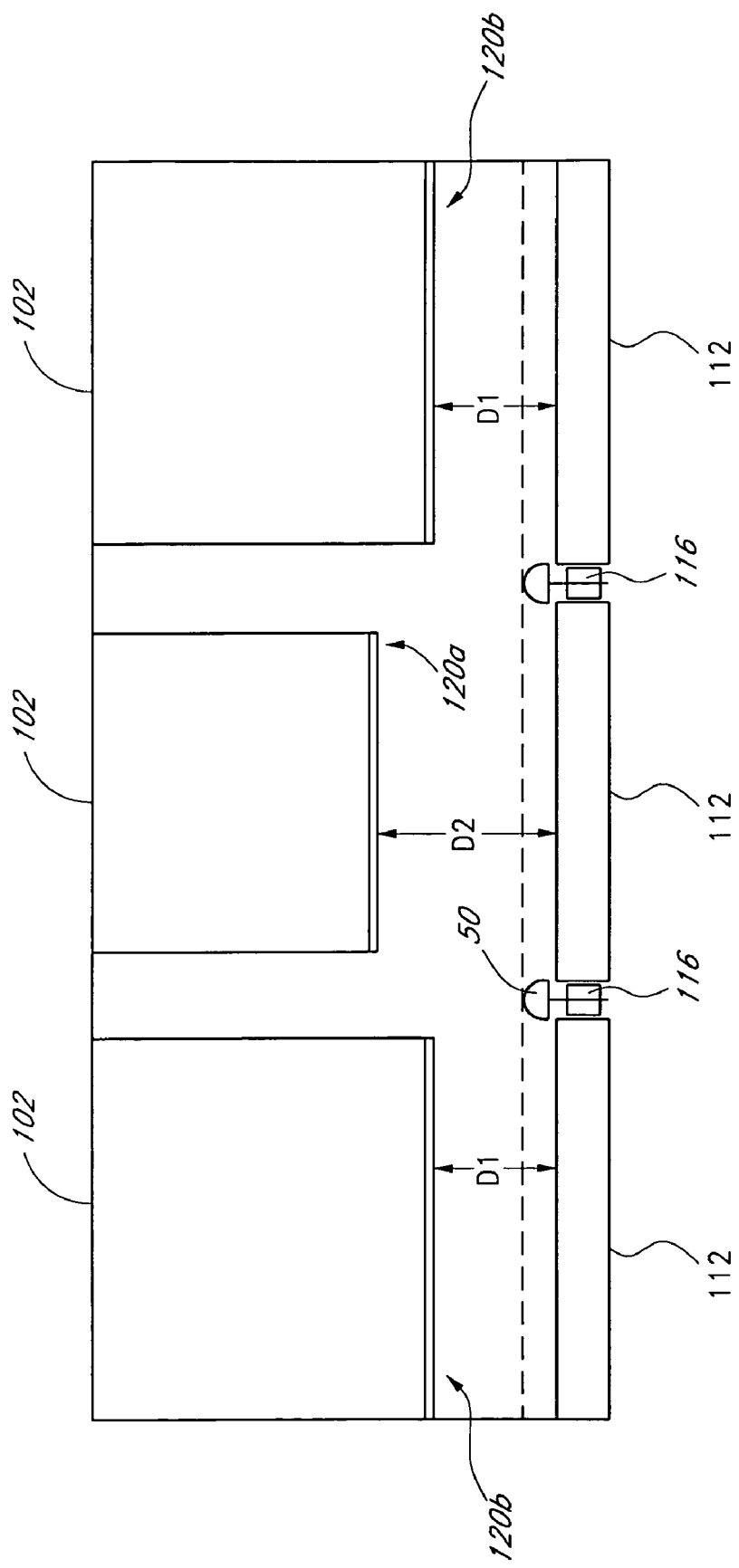
FIG. 13 is a top view of a supermarket freezer compartment containing two types of standard shelves

As shown in FIG. 12-13, the front edges of the shelves 102 form a product display plane 120. Depending upon the depth of the shelves 102, the product display plane 120 may be a certain distance S1 from the lighting assembly 50. However, the customer may have several options for placement of the shelves 102 within the refrigerator compartment 104 such that the product display plane 120a or 120b may be located at a distance D1 or D2 from the refrigerator door 112. For example, in certain embodiments, the customer may be able to choose from between a 1-4" or alternately between a 7-10" distance from the front edge of the shelves and the refrigerator door 112. The product display plane 120a or b extends horizontally across the width of the shelves 102 and represents the central display section of the refrigerator compartment 104. In order to make the display section both visible and visually appealing, it is desirable to provide uniform illumination over the height and width of the product display plane 120a or b. As discussed above, the option of several distances precludes the possibility of designing a linear lens for providing uniform illumination at both distances, however, it is possible to design a linear lens for providing substantially uniform illumination at both distances, which is less nonuniform than the illumination provided by fluorescent tubes, which produce a peaked distribution such as in FIG. 1A.

Figure 14:
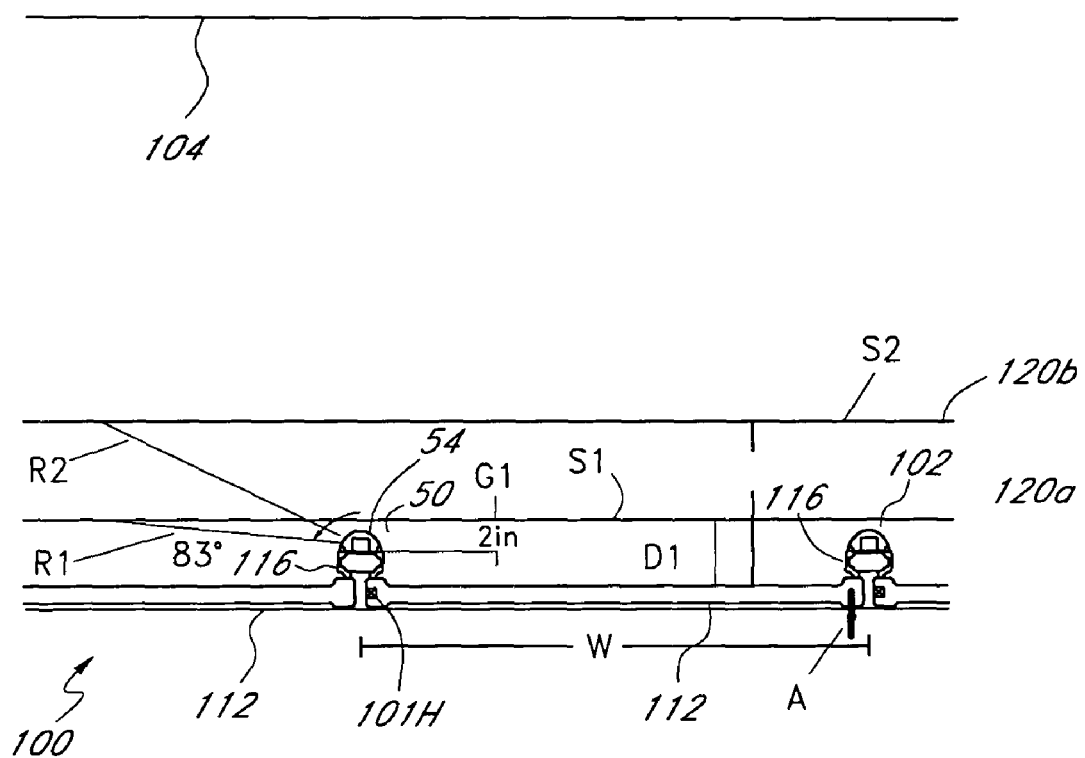
FIG. 14 is an expanded top view of the light strips of the supermarket freezer compartment of FIG. 13.

FIG. 14 depicts a schematic cross sectional view of one embodiment of a supermarket cold-storage food compartment as described above. Here, multiple display doors 112 having a width of about 30" are attached to mullion frames 116. Light strips 50 are vertically mounted along the height of the mullion frames 116. The elongated lens 54 of each lighting strip 50 are designed to scatter light across a width of about 30 inches such that each light strip 50 will provide illumination across one half of the shelves corresponding to each adjacent door 112.

As shown in FIGS. 13-14, display plane 120a indicates a first optional shelf position wherein the front edges of the shelves are located at distance D1 from display door 112. Display plane 120b represents a second optional shelf position wherein the front edges of the shelves are located at distance D2 from display door 112. Distance D1 may be between about 1-4 inches while distance D2 may be between about 7-10 inches, for example, distance D1 may be 4 inches and D2 may be 10 inches. The light strip 50 is mounted on the rear side of the mullion frame 116 and is therefore positioned closer to the display planes 120a-b. Here, the mullion frame 116 extends approximately two inches into the refrigerator compartment 104, therefore display plane 120a is positioned at a distance S1 from the light strip 50 and display plane 120b is positioned at a distance S2 from the light strip 50. Here, the distance S1 is relatively small, approximately 2 inches or less. This means that extreme ray R1 from the light strip 50 to the center of product display plane 120a lies at 83° from axis L, while extreme ray R2 from the light strip 50 to the center of product display plane 120b lies at the same 60° angle as the above-mentioned ray fan 63 of FIG. 6C. Thus, the provision of uniform illumination along product display plane 120a would require a different shaped lens than would be required for provision of uniform illumination along product display plane 120b. Here, a lens as described in FIG. 6A would be sufficient to uniformly product display plane 120b. However, the 170° pattern required to uniformly illuminate product display plane 120a requires bending angles beyond the capability of the refractive deflections of the lenses described above. Moreover, to provide substantially uniform illumination at two different distances, such as both product planes 120a and b, requires additional modifications to the cross sectional shape of the elongate cylindrical lens.

Figure 15:
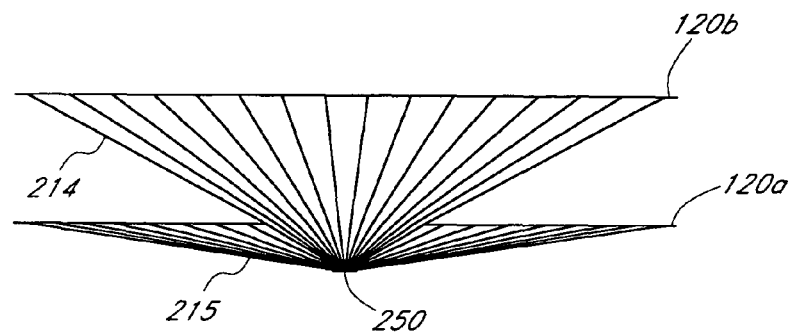
FIG. 15 shows an embodiment of a linear lens that accommodated two shelf lengths by producing a compromise illumination distribution.

Such an elongate cylindrical lens may be designed to provide for substantially uniform illumination across product display planes positioned at two different distances from the lighting assembly. For example, FIG. 15 shows light rays from a linear Tensed light source 250 illuminating an upper planar target 120b and a lower planar target 120a. Here, the central portion of the lens may be shaped such that a middle cone of light rays 214 are refracted to provide uniform illumination over the second product plane 120b located at a father distance, D2, from the lensed light source 250. The outer, lateral regions of the lens are shaped such that the lateral rays 214 are refracted to uniformly illuminate the lateral regions of the first product display plane 120a located at a closer distance, D1, from the lensed light source 250.

In use, such a lens may be used to provide substantially uniform illumination for a product display plane located at either distance. For a product display plane 120b located at the farther distance, D2, the light from the central cone of rays 214 will provide uniform illumination over the width of the product display plane 120b, while the outer light rays 215 will be refracted beyond the edges of the product display plane 120b by the outer portions of the lens, but typically this light will hit the shelves of adjacent doors. Conversely, for a product display plane 120a located at the closer distance, D1, the outer light rays 215 refracted through the outer portions of the lens will provide uniform illumination over the outer regions of the product display plane 120a. While the light, from the central cone of rays 214, illuminating the central region of a closer product display plane 120b will not be uniform relative to the light illuminating the outer regions, the illumination peak produced in the central region will be far less severe than with the LEDs alone, shown in FIG. 1C, and the overall illumination across the closer product display plane 120a will be substantially less non-uniform than previously achievable illumination.

Figure 16:
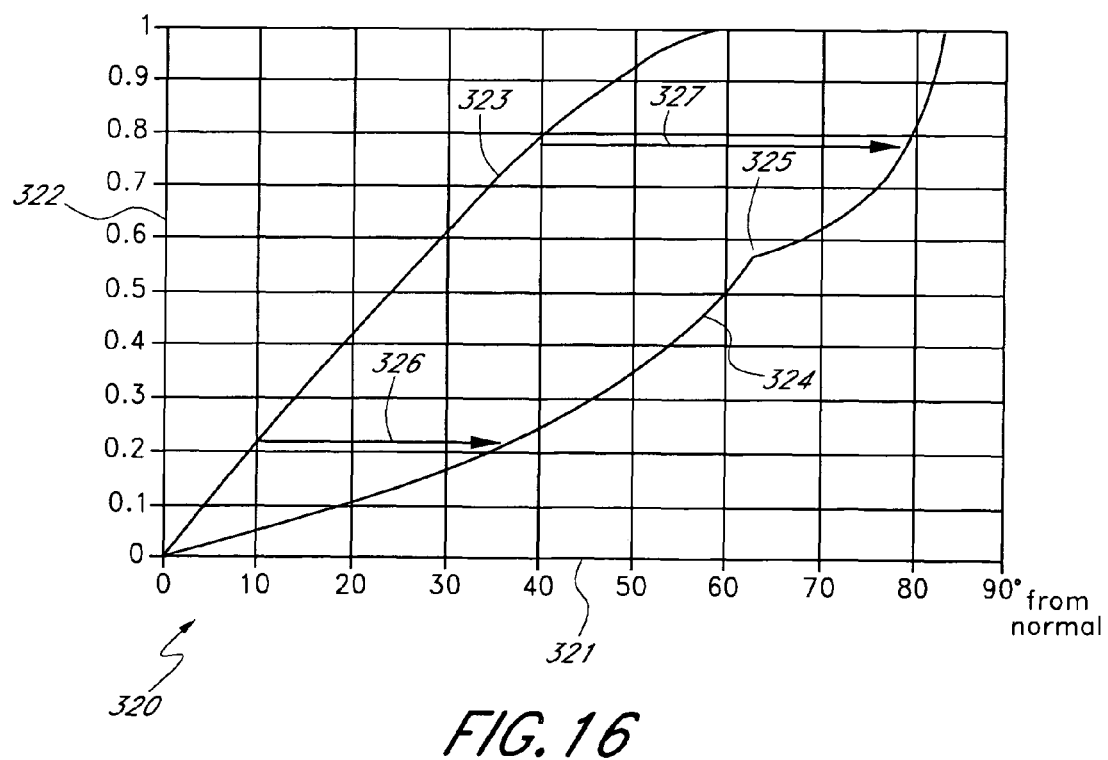
FIG. 16 shows the cumulative distribution curves for designing a lens.

As described above, designing a cylindrical lens to provide substantially uniform illumination over targets located at two different distances involves selecting the curvature of the lens to map each α to a particular β (referred to herein as the β(α) function) such that C(β)=C(α). FIG. 16 shows both the cumulative distribution for the light source C(α) of FIG. 15 and the cumulative distribution C(β) along the product display planes 120a and b which may be used to design a linear lens for providing substantially uniform illumination over both planes. Graph 320 has horizontal axis 321 graduated in degrees from normal and vertical axis 322 graduated from zero to 1, denoting cumulative flux. Curve 323 represents the cumulative source flux of the lensed light source 250 relative to the lateral angle from the LED array. Curve 324 represents the cumulative flux delivered to targets 120a and b that provides the substantially uniform illumination described above and depicted in FIG. 15. Inflection point 325 corresponds to the switch from upper display plane 120b to lower display plane 120a.

As previously mentioned, the lens deflects light ray emanating from the source at an angle α to an angle β such that α, the particular value of C(α) equals C(β)=C(α), where β represents the lateral angle from the lens to the target. For example, arrow 326 shows that rays exiting the light source at 10° are deflected to 35°. Likewise as shown by arrow 327, rays exiting the light source at 40° are deflected to 80°. This mapping from input curve 323 to output curve 324 gives the total deflection function β(α). Once the total deflection function is known, the cross-sectional shape of a cylindrical lens may be designed to refract light rays from the light source based on the deflection function β(α).

Figure 17A:
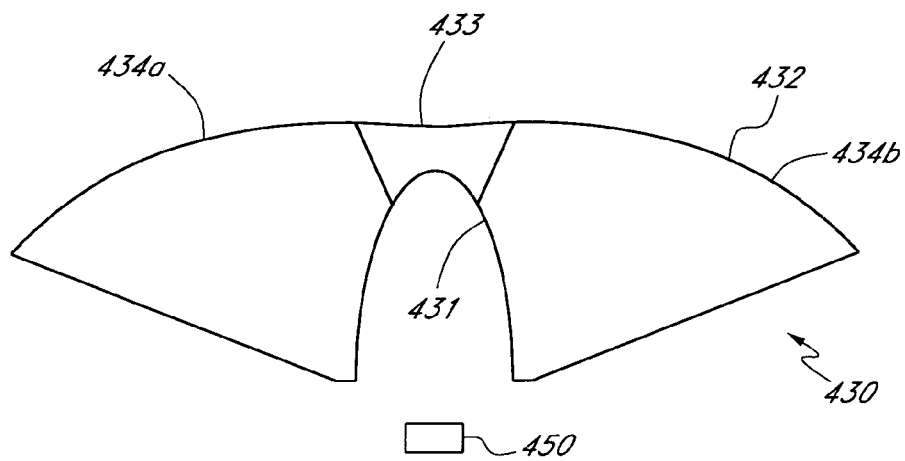
FIG. 17A shows the cross-section of a linear lens that provides a compromise distribution illuminating a 1 meter wide shelf placed at one of two distances from the light source.

Such a lens typically has a lower or rear curved surface and an upper or front curved surface, both of which refract light incident thereon to contribute to the total redistribution to provide the necessary deflection to achieve the light distribution as described above. FIG. 17A shows the cross-sectional profile of the cylindrical lens 430 resulting from applying the design method to the illumination situation of FIG. 15, according to the curves of FIG. 16. Linear lens 430 has an arched lower surface 431 with a steep or high curvature and a much larger upper surface 432 with a much more shallow or low curvature. In certain embodiments, the lens 430 may have three distinct regions for providing different distributions of the light rays from the light source. For example, as shown in FIG. 17A, the lens may include a central region 433 surrounded by identical outer regions 434a and b. The central region may be designed to provide a certain distribution for the central cone of light rays emanating from the light source while the outer regions 434a and b may have a different surface shape for providing a different distribution of the lateral rays emanating from the light source. Depending on the width of the targets and the different distances of the targets from the light source, the upper and lower surfaces of each region may be shaped to provide a negative optical power for deflecting incident rays outward or alternately a positive optical power for deflecting incident rays inwards. In certain embodiments, it is envisioned that the central region may have a negative optical power for diverging light incident thereon while the outer regions may have a positive optical power for converging light incident thereon.

Figure 17B:
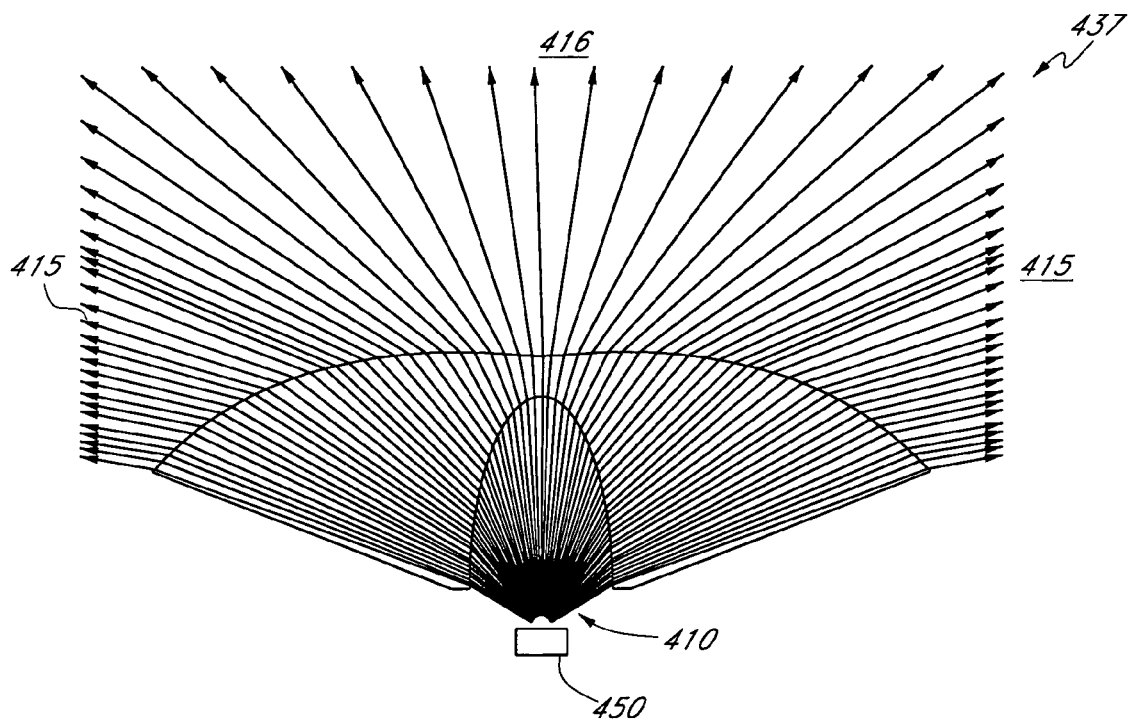
FIG. 17B shows same with light rays.

In use, when lens 430 is positioned over LED array 450, as shown in FIG. 17B, the meridional ray-fan 410 emanating from LED array 433 is refracted into exiting fan 420 which is flux-distributed via the deflection function $\beta(\alpha)$ to provide the light distribution on planar targets at D1 and D2 as shown in FIG. 14. The exiting fan 420 has three distinct regions. The central region 416 is comprised of less densely spaced rays for uniformly illuminating the farther product display plane 120b in comparison to the lateral regions 415 which are comprised of more densely spaced rays for providing uniform illumination across the outer, lateral regions of the closer product display plane 120a.

Figure 18B:
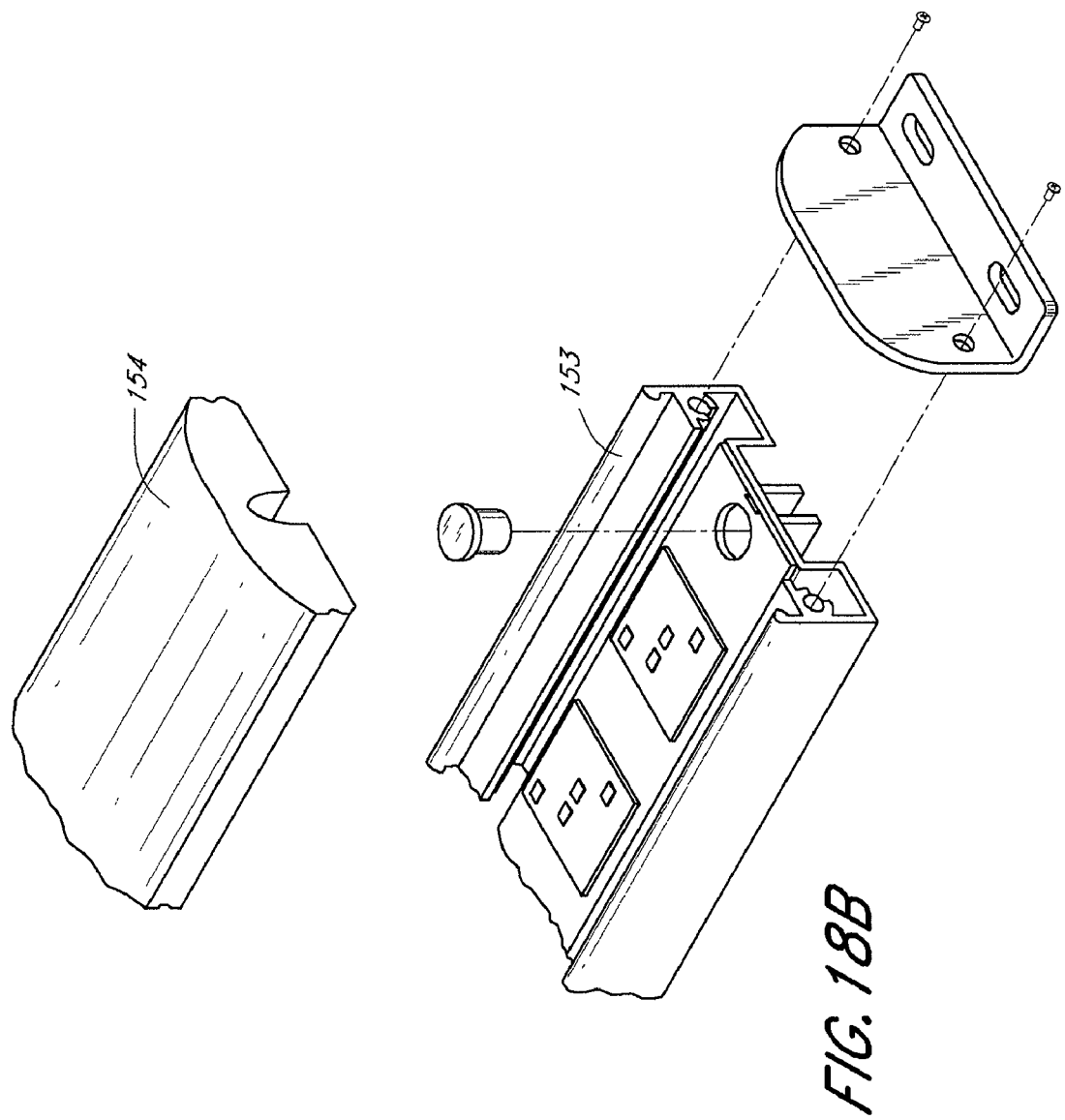
FIG. 18B shows an expanded view of the linear lens system of FIG. 18A.

FIGS. 18A-B show one embodiment of a linear lighting system 150 for providing the above described compromise illumination distribution over multiple product display planes to accommodate different shelf lengths. With reference to FIGS. 13-14, the lighting system 150, may be designed to be placed on a mullion frame 116 between two adjacent refrigerator compartments 104 such that the lighting system 150 may provide illumination across approximately one-half of each refrigerator compartment's shelving system. In such embodiments, a second lighting system 150 may be located on the mullion frame 116 on the opposite side of the refrigerator compartment 104 to illuminate the other half of the shelving system, or alternatively, an asymmetric lighting system, described below, may be provided to illuminate the other half of the shelving system.

The lighting system 150 includes a linear array of LEDs 151 spaced apart along a low-voltage tape 152. The light tape 152 is mounted on an extruded bracket 153 which holds a linear lens 154 in position over the array of LEDs 151. The extruded bracket 153 may be mounted to the mullion frame 116 of the refrigerator compartment 104. A linear lens 154 is positioned in the extruded bracket 153 over the LED tape 152 such that light from the LEDs 151 will be transmitted through the linear lens 154. As depicted here, in certain embodiments, the linear lens 154 may advantageously comprise a lens as described in FIG. 18A which has an arched lower surface 154L with a steep or high curvature and a much larger upper surface 154H with a much more shallow or low curvature. In certain embodiments, additional side portions 154S of the lower surface 154L may extend from the arched lower surface 154L, for example, to provide attachment surfaces for bracket 153. These side surfaces 154S may further comprise a diffuser, or diffusing region, to uniformly scatter light incident on the side portions of the lower surface, thereby reducing or minimizing any non-uniform contributions at the product display plane. The diffuser may comprise a separate layer laminated to the lower surface 154L of the linear lens 154, shown in phantom on FIG. 18A or, alternatively, may comprise surface relief features, e.g. formed during the extrusion process for the linear lens 154. In certain embodiments, the diffuser may alternatively comprise one or more diffusers 156 (e.g., vertical diffusers) positioned along opposite sides of the LEDs 151 and extending along the vertical axes formed by the lower curved surface 154L. In an alternative embodiment, the side portions may further include a mask layer to substantially prevent transmission of light from the LED through the side portions of the lower surface, thereby reducing any non-uniform contributions to the illumination at the product display plane. As discussed above with respect to the diffuser, the mask layer may comprise an opaque layer laminated to the horizontal surface of the side portions 154S, or alternatively, the mask layer may comprise one or more baffles (e.g., vertical baffles) extending perpendicular to the horizontal side surface along opposite sides of the LEDs 151. This configuration may provides substantially uniform illumination to a planar target the width of one of the shelves, wherein the planar target is located at either a distance of between about 1-4 inches or alternatively between about 7-10 inches.

Figure 19A:
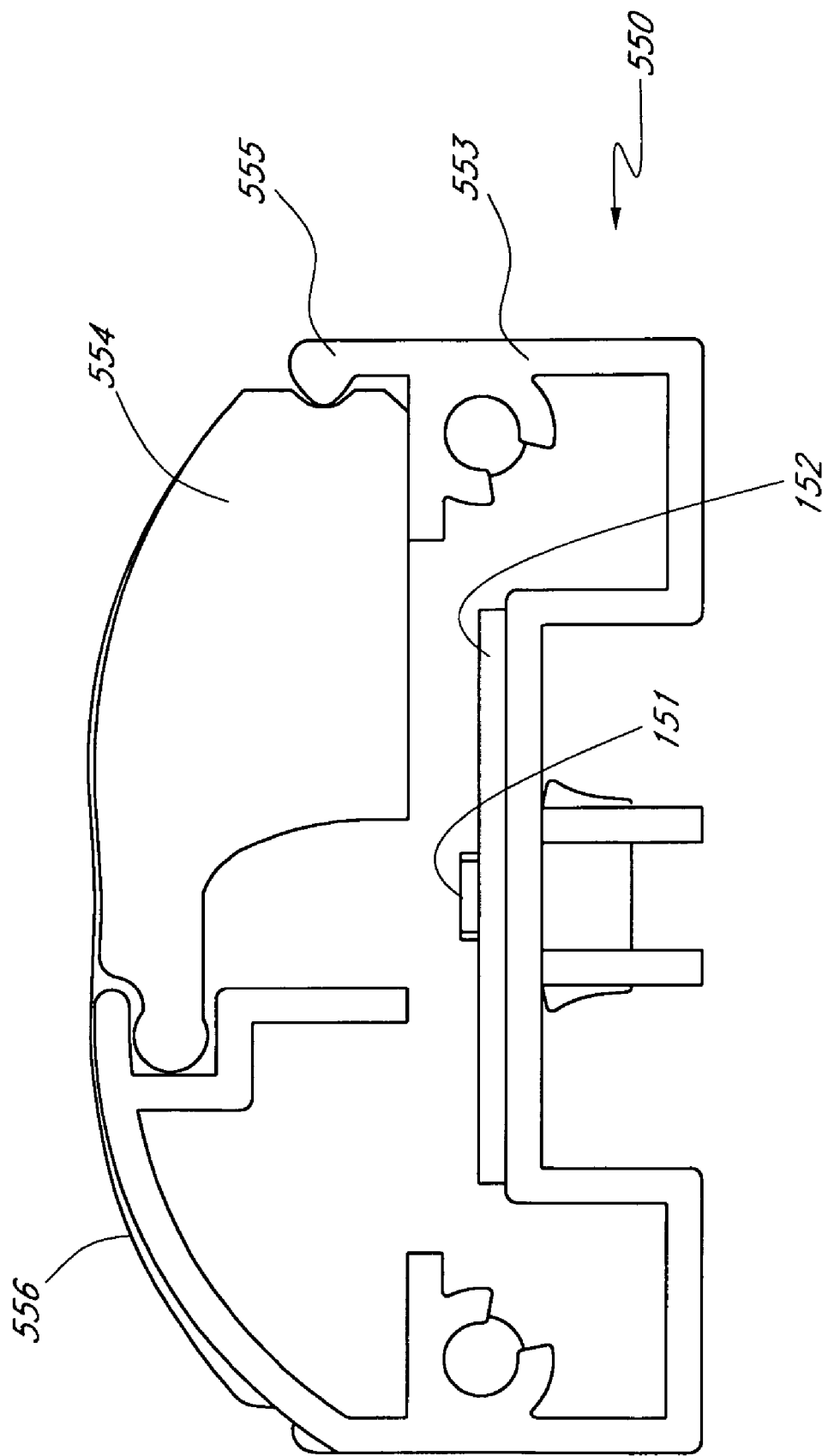
FIG. 19A shows a top view of a linear lens system for providing a compromise illumination distribution over an area the size of about half a shelf width for a supermarket freezer compartment.
Figure 19B:
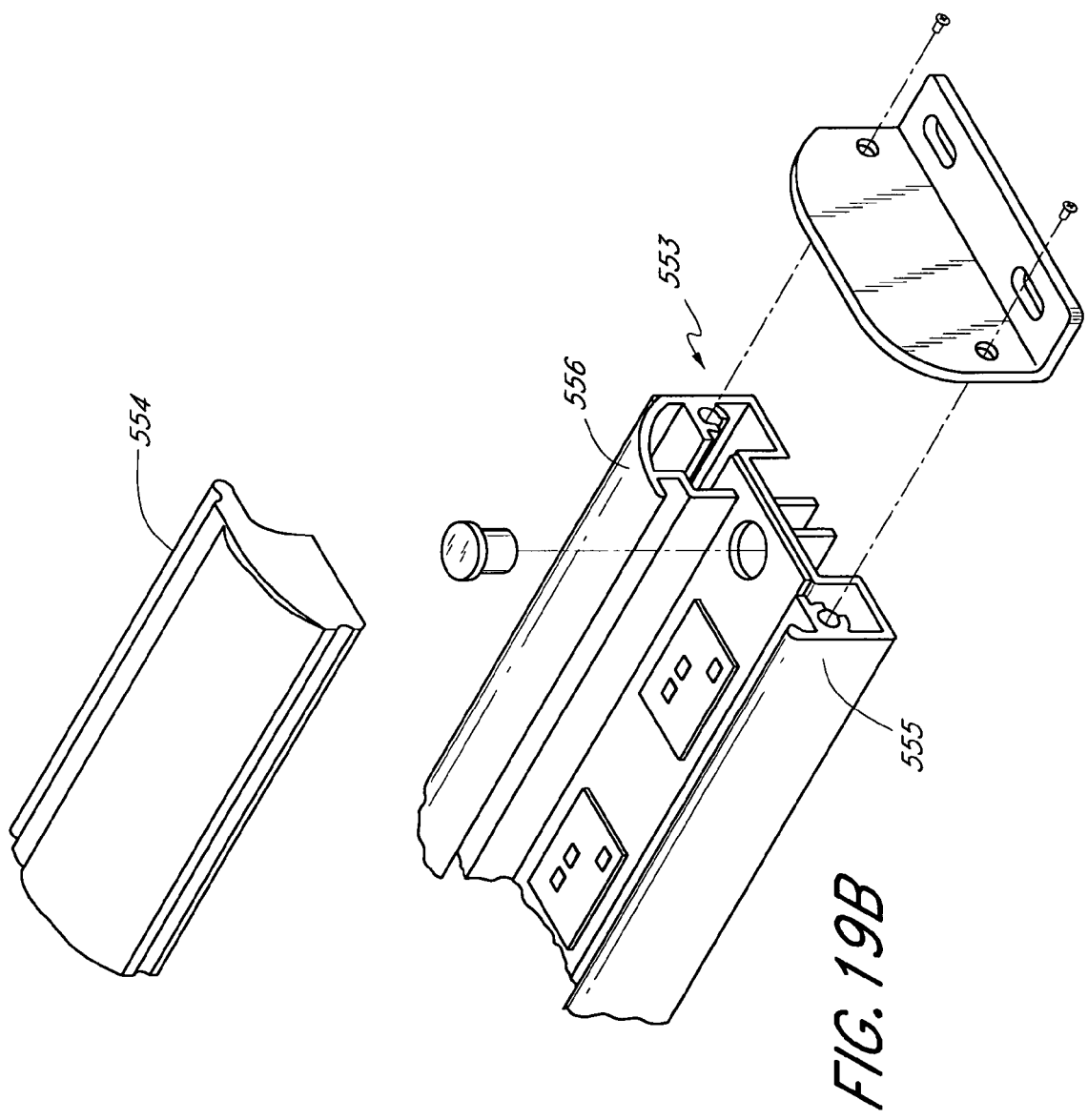
FIG. 19B shows an expanded view of the linear lens system of FIG. 19A.

As shown in FIGS. 19A-B, in certain embodiments, situations may arise wherein asymmetric illumination may be desired. For example, as discussed above, in commercial refrigerators containing multiple refrigerator compartments separated by mullion frames, the end or outermost refrigeration compartments may require an asymmetric lighting system to illuminate one half of the outermost shelving system. In these situations, an asymmetric lighting system 550 may be provided. The asymmetric lighting system 550 includes a linear array of LEDs 151 spaced apart along a low voltage tape 152. The light tape 152 is mounted on an extruded bracket 553. The extruded bracket 553 includes a lip 555 extending from one side of the bracket 553 and a larger overhang 556 extending from the opposite side of the bracket 553 and curving over a portion of the light tape 152. The overhang 556 maybe opaque so that it blocks light from the light tape from being transmitted therethrough. An asymmetric linear lens 554 is positioned over the array of LEDs 151 and held in place between the lip 555 and the overhang 556. The linear lens 554 is positioned such that a first portion of the planar ray fan emitted from the LEDs 151 will be transmitted through the linear lens 554 and be distributed over a planar surface having a width of about half the shelf width while a second portion of the planar ray fan will be blocked by the opaque overhang 556 of the extruded bracket 553. Thus, the lighting system 550 may provide an asymmetric light distribution. In certain embodiments, as depicted herein, the design of the linear lens 554 may comprise using one half of the lens 154 described above, such that the asymmetric distribution may provide substantially uniform illumination of a planar target located at either a distance of between about 1-4 inches or alternatively between about 7-10 inches.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A lighting system comprising:

an array of light emitting diodes; and a cylindrical lens having a central portion and a pair of surrounding outer portions, said cylindrical lens disposed to receive light from said light emitting diodes to redistribute said light, wherein (i) said central portion is shaped to uniformly illuminate a first planar region disposed a first distance from said array and (ii) said outer portions of said cylindrical lens are shaped to uniformly illuminate outer portions of a second planar region at a second distance from the array.

2. The lighting system of claim 1, wherein said second distance is less than said first distance.

3. A refrigerator door assembly comprising a door frame, said lighting system of claim 1 secured to said refrigerator door assembly.

4. The refrigerator door assembly of claim 3, further comprising at least one refrigerator door.

5. A refrigerator comprising:
a refrigerator door frame;
at least one refrigerator door;
a refrigerator compartment; and
at least one shelf positioned in said refrigerator compartment;
said lighting system of claim 1 disposed such that a front edge of said at least one shelf intersects said first or second planar regions.

6. A refrigerator comprising:
a refrigerator door frame;
at least one refrigerator door;
a refrigerator compartment;
a plurality of shelves positioned in said refrigerator compartment such that front edges of said plurality of shelves form a product display plane transverse to said plurality of shelves;
an array of light emitting diodes; and
a cylindrical lens having front and rear curved surfaces, said cylindrical lens disposed to receive light from said light emitting diodes and to redistribute said light, said cylindrical lens being located no more than about 8 inches distance from the front edges of said plurality of shelves,
wherein said front and rear surfaces of said cylindrical lens are shaped to provide substantially uniform illumination across a portion of said product display plane having a width substantially equal to the width of said front edge of one of said shelves.

7. The refrigerator of claim 6, wherein said substantially uniform illumination varies by no more than about 30% per inch.

8. The refrigerator of claim 6, wherein said front and rear curved surfaces are shaped to provide substantially uniform illumination across outer regions of a second plane disposed no more than 2 inches from said cylindrical lens.

9. A refrigerator comprising:
a refrigerator door frame;
at least one refrigerator door;
a refrigerator compartment;
a plurality of shelves positioned in said refrigerator compartment such that front edges of said plurality of shelves form a product display plane transverse to said plurality of shelves;
an array of light emitting diodes; and
a cylindrical lens having front and rear curved surfaces, said cylindrical lens disposed to receive light from said light emitting diodes and to redistribute said light, said cylindrical lens located no more than 2 inches distance from the front edges of said plurality of shelves,
wherein said front and rear surfaces are shaped to provide substantially uniform illumination across a pair of spaced apart regions in said product display plane.

10. The refrigerator of claim 9, wherein said substantially uniform illumination varies by no more than about 30% per inch across the spaced apart regions of said product display plane.

11. The refrigerator of claim 9, wherein said front and rear curved surfaces are shaped to provide illumination that varies no more than about 30% per inch across a central region between said pair of spaced apart regions, said central region being between about 6 inches and 12 inches wide.

12. A lighting system comprising:
an array of light emitting diodes; and
a cylindrical lens having a central portion and a pair of surrounding outer portions, said central portion shaped to refract light from the light emitting diodes into an inner distribution of angles and said pair of surrounding outer portions shaped to refract light from the light emitting diodes into an outer distribution of angles disposed about said inner distribution of angles,
such that (i) light in said inner distribution of angles illuminates a central region of a first plane more uniformly than said light in said outer distribution illuminates outer regions of said first plane and (ii) light in said outer distribution illuminates outer regions of a second plane more uniformly than said light in said inner distribution illuminates an inner region of said second plane.

13. The lighting system of claim 12, wherein the illuminated area of the outer regions of the second plane is at least one-half the illuminated area of the central region of the first plane.

14. A refrigerator door assembly comprising a door frame, said lighting system of claim 12 secured to said refrigerator door assembly.

15. The refrigerator door assembly of claim 14, further comprising at least one door.

16. A refrigerator comprising:
a refrigerator door frame;
at least one refrigerator door;
a refrigerator compartment; and
at least one shelf positioned in said refrigerator compartment;
said lighting system of claim 12 disposed such that a front edge of said at least one shelf intersects said first or second planes.

17. A lighting system comprising:
an array of light emitting diodes; and
a cylindrical lens having a central portion and a pair of surrounding outer portions,
wherein (i) said central portion is shaped to match the cumulative lateral flux of the array of light emitting diodes with the cumulative lateral flux of a uniformly illuminated central region of a first plane and (ii) said outer portions of said cylindrical lens are shaped to match the cumulative lateral flux of the array of light emitting diodes with the cumulative lateral flux of a uniformly illuminated outer region of a second plane.

18. A refrigerator door assembly comprising a door frame, said lighting system of claim 17 secured to said refrigerator door assembly.

19. A refrigerator door assembly of claim 18, further comprising at least one door.

20. A refrigerator comprising:
a refrigerator door frame;
at least one refrigerator door;
a refrigerator compartment; and at least one shelf positioned in said refrigerator compartment;

said lighting system of claim 17 disposed such that a front edge of said at least one shelf intersects said first or second planes.

21. A lighting system comprising:

an array of light emitting diodes; and a cylindrical lens disposed to receive light from said light emitting diodes to redistribute said light, said cylindrical lens having first and second curved surfaces, said first surface having negative optical power, said second surface having a central portion and a pair of surrounding outer portions, said central portion having negative optical power to increase uniformity in illuminating a first planar region and said outer portions having positive optical power so as to increase uniformity in illuminating a second planar region.

22. The lighting system of claim 21, wherein said first planar region is located at a first distance from said cylindrical lens and said second planar region is located at a second distance from said cylindrical lens and wherein said second distance is less than said first distance.

23. The lighting system of claim 22, wherein said second distance is about 2 inches.

24. A refrigerator door assembly comprising a door frame, said lighting system of claim 21 secured to said refrigerator door assembly.

25. The refrigerator door assembly of claim 24, further comprising at least one door.

26. A refrigerator comprising:

a refrigerator door frame;

at least one refrigerator door;

a refrigerator compartment; and at least one shelf positioned in said refrigerator compartment;

said lighting system of claim 21 disposed such that a front edge of said at least one shelf intersects said first or second planar regions.

27. A refrigerator comprising:

a refrigerator door frame;

at least one refrigerator door;

a refrigerator compartment;

a plurality of shelves positioned in said refrigerator compartment such that front edges of said plurality of shelves form a product display plane transverse to said plurality of shelves;

an array of light emitting diodes; and a cylindrical lens having front and rear curved surfaces, said cylindrical lens disposed to receive light from said light emitting diodes and to redistribute said light, wherein said front and rear surfaces of said cylindrical lens are shaped to match the cumulative lateral flux of the array of light emitting diodes with the cumulative lateral flux of a uniformly illuminated portion of said product display plane.

28. The refrigerator of claim 27, wherein said cylindrical lens comprises a central portion and an outer portion, and the front surface of the central portion is convex.

29. A refrigerator comprising:

a refrigerator door frame;

at least one refrigerator door;

a refrigerator compartment;

a plurality of shelves positioned in said refrigerator compartment such that front edges of said plurality of shelves form a product display plane transverse to said plurality of shelves;

an array of light emitting diodes; and a cylindrical lens disposed to receive light from said light emitting diodes to redistribute said light, said cylindrical lens having a central portion and an outer portion, said central portion providing more light divergence than said outer portion so as to increase uniformity in illuminating a planar region.

30. The refrigerator of claim 29, wherein said central portion has negative power and said outer portion has negative power.

31. The refrigerator of claim 29, wherein said central portion has positive power and said outer portion has positive power.

32. A lighting system comprising:

an array of light emitting diodes; and a cylindrical lens having front and rear surfaces, said cylindrical lens disposed to receive light from said light emitting diodes and to redistribute said light, the rear surface comprising side portions; and a diffuser positioned between said array of light emitting diodes and said cylindrical lens configured to scatter light incident on the side portions of the rear surface, wherein said front and rear surfaces of said cylindrical lens are shaped to match the cumulative lateral flux of the array of light emitting diodes with the cumulative lateral flux of a uniformly illuminated portion of a planar region.

33. A lighting system comprising:

an array of light emitting diodes;

a cylindrical lens having front and rear surfaces, said cylindrical lens disposed to receive light from said light emitting diodes and to redistribute said light; and a mask positioned between said array of light emitting diodes and said cylindrical lens, said mask configured to block transmission of light incident thereon, wherein said front and rear surfaces of said cylindrical lens are shaped to match the cumulative lateral flux of the array of light emitting diodes with the cumulative lateral flux of a uniformly illuminated portion of a planar region.

* * * * *

UNITED STATES PATENT AND TRADEMARK OFFICE
CERTIFICATE OF CORRECTION

PATENT NO.        : 7,731,395 B2              Page 1 of 1
APPLICATION NO.   : 11/493368
DATED             : June 8, 2010
INVENTOR(S)       : Parkyn et al.

It is certified that error appears in the above-identified patent and that said Letters Patent is hereby corrected as shown below:

Column 13, Line 60, "a linear Tensed" should be changed to --a linear lensed--

Signed and Sealed this
Seventeenth Day of January, 2012

David J. Kappos
*Director of the United States Patent and Trademark Office*